US012593167B2

(12) United States Patent
Frank

(10) Patent No.: US 12,593,167 B2
(45) Date of Patent: Mar. 31, 2026

(54) SYSTEMS AND METHODS OF USER LOCALIZATION

(71) Applicant: Sonos, Inc., Santa Barbara, CA (US)

(72) Inventor: Eric Frank, Philadelphia, PA (US)

(73) Assignee: Sonos, Inc., Goleta, CA (US)

( * ) Notice: Subject to any disclaimer, the term of this patent is extended or adjusted under 35 U.S.C. 154(b) by 218 days.

(21) Appl. No.: 18/301,402

(22) Filed: Apr. 17, 2023

(65) Prior Publication Data

US 2023/0319464 A1 Oct. 5, 2023

Related U.S. Application Data

(63) Continuation of application No. 17/453,633, filed on Nov. 4, 2021, now Pat. No. 11,659,323, which is a continuation of application No. 16/948,609, filed on Sep. 24, 2020, now Pat. No. 11,184,702, which is a continuation of application No. 16/353,774, filed on
(Continued)

(51) Int. Cl.
*H04R 1/40* (2006.01)
*G01S 5/18* (2006.01)
*G10L 15/22* (2006.01)
*G10L 15/28* (2013.01)
*H04R 27/00* (2006.01)
*H04R 3/00* (2006.01)
*H04R 5/04* (2006.01)

(52) U.S. Cl.
CPC .............. *H04R 1/406* (2013.01); *G01S 5/18* (2013.01); *G10L 15/22* (2013.01); *G10L 15/28* (2013.01); *H04R 27/00* (2013.01); *H04R 3/005* (2013.01); *H04R 5/04* (2013.01); *H04R*

2205/021 (2013.01); *H04R 2227/003* (2013.01); *H04R 2227/005* (2013.01); *H04R 2410/00* (2013.01); *H04R 2430/23* (2013.01)

(58) Field of Classification Search
CPC ........... H04R 1/406; H04R 27/00; G01S 5/18; G10L 15/22; G10L 15/28
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

CN 107656244 A 2/2018
EP 1389853 A1 2/2004
(Continued)

OTHER PUBLICATIONS

AudioTron Quick Start Guide, Version 1.0, Mar. 2001, 24 pages.
(Continued)

*Primary Examiner* — Olisa Anwah
(74) *Attorney, Agent, or Firm* — Fortem IP LLP

(57) ABSTRACT

Systems and methods are disclosed in which a playback device transmits a first sound signal including a predetermined waveform. In one example, the playback device receives a second sound signal including at least one reflection of the first sound signal. The second sound signal is processed to determine a location of a person relative to the playback device, and a characteristic of audio reproduction by the playback device is selected, based on the determined location of the person.

20 Claims, 19 Drawing Sheets

600

Transmit a first sound signal comprising a predetermined waveform — S610

Receiving a second sound signal comprising at least one reflection of the first sound signal — S620

Process the second sound signal to determine a location of a person — S630

Select a characteristic of audio reproduction based on the determined location — S640

Related U.S. Application Data

Mar. 14, 2019, now Pat. No. 10,791,396, which is a continuation of application No. 16/149,992, filed on Oct. 2, 2018, now Pat. No. 10,277,981.

(56) References Cited

U.S. PATENT DOCUMENTS

| | | | |
|---|---|---|---|
| 5,829,782 | A | 11/1998 | Breed et al. |
| 5,923,902 | A | 7/1999 | Nagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,661,424 | B1 | 5/2017 | Bakish et al. |
| 9,897,696 | B2 | 2/2018 | Lee et al. |
| 10,795,018 | B1* | 10/2020 | Koteshwara ........... H04R 1/406 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2008/0232608 | A1* | 9/2008 | Ullmann ................ H04S 7/302 |
| | | | 381/77 |
| 2013/0170647 | A1* | 7/2013 | Reilly .................... H04R 27/00 |
| | | | 381/17 |
| 2015/0263692 | A1* | 9/2015 | Bush ........................ H04R 3/00 |
| | | | 381/103 |
| 2016/0174011 | A1 | 6/2016 | Rider et al. |
| 2016/0345113 | A1 | 11/2016 | Lee et al. |
| 2017/0242651 | A1* | 8/2017 | Lang ....................... G06F 3/167 |

FOREIGN PATENT DOCUMENTS

| | | | |
|---|---|---|---|
| GB | 2203315 | A | 10/1988 |
| JP | 2003092799 | A | 3/2003 |
| JP | 2017534881 | A | 11/2017 |
| KR | 101778209 | B1 | 9/2017 |
| KR | 20170137810 | A | 12/2017 |
| WO | 200153994 | | 7/2001 |
| WO | 2003093950 | A2 | 11/2003 |
| WO | 2018077713 | A2 | 5/2018 |

OTHER PUBLICATIONS

AudioTron Reference Manual, Version 3.0, May 2002, 70 pages.
AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 mailed on Dec. 20, 2022, issued in connection with European Application No. 19791008.6, 8 pages.
First Action Interview Office Action mailed on Sep. 21, 2021, issued in connection with U.S. Appl. No. 16/948,609, filed Sep. 24, 2020, 3 pages.
International Bureau, International Preliminary Report on Patentability and Written Opinion, mailed on Apr. 15, 2021, issued in connection with International Application No. PCT/US2019/054060, filed on Oct. 1, 2019, 10 pages.
International Bureau, International Search Report and Written Opinion mailed on Jan. 8, 2020, issued in connection with International Application No. PCT/US2019054060, filed on Oct. 1, 2019, 14 pages.
Jo et al., "Synchronized One-to-many Media Streaming with Adaptive Playout Control," Proceedings of SPIE, 2002, bp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Korean Patent Office, Korean Examination Report and Translation mailed on Jul. 24, 2023, issued in connection with Korean Application No. 10-2021-7013185, 18 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Oct. 6, 2022, issued in connection with U.S. Appl. No. 17/453,633, filed Nov. 4, 2021, 10 pages.
Non-Final Office Action mailed on May 11, 2020, issued in connection with U.S. Appl. No. 16/353,774, filed Mar. 14, 2019, 4 pages.
Notice of Allowance mailed on Feb. 1, 2023, issued in connection with U.S. Appl. No. 17/453,633, iled on Nov. 4, 2021, 6 pages.
Notice of Allowance mailed on Dec. 19, 2018, issued in connection with U.S. Appl. No. 16/149,992, filed Oct. 2, 2018, 6 pages.
Notice of Allowance mailed on May 26, 2020, issued in connection with U.S. Appl. No. 16/353,774, filed Mar. 14, 2019, 6 pages.
Notice of Allowance mailed on Oct. 6, 2021, issued in connection with U.S. Appl. No. 16/948,609, filed Sep. 24, 2020, 6 pages.
Palm, Inc., "Handbook for the Palm VII Handheld," May 2000, 311 pages.
Preinterview First Office Action mailed on Aug. 13, 2021, issued in connection with U.S. Appl. No. 16/948,609, filed Sep. 24, 2020, 4 pages.
Preinterview First Office Action mailed on Nov. 21, 2018, issued in connection with U.S. Appl. No. 16/149,992, filed Oct. 2, 2018, 4 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, European Extended Search Report mailed on Mar. 5, 2025, issued in connection with European Application No. 24212302.4, 11 pages.

(56) References Cited

OTHER PUBLICATIONS

Korean Patent Office, Korean Examination Report and Translation mailed on May 22, 2024, issued in connection with Korean Application No. 10-2021-7013185, 9 pages.

Korean Patent Office, Korean Notice of Allowance and Translation mailed on Oct. 22, 2024, issued in connection with Korean Application No. 10-2021-7013185, 10 pages.

Korean Patent Office, Korean Preliminary Rejection and Translation mailed on Feb. 6, 2024, issued in connection with Korean Application No. 10-2021-7013185, 14 pages.

* cited by examiner

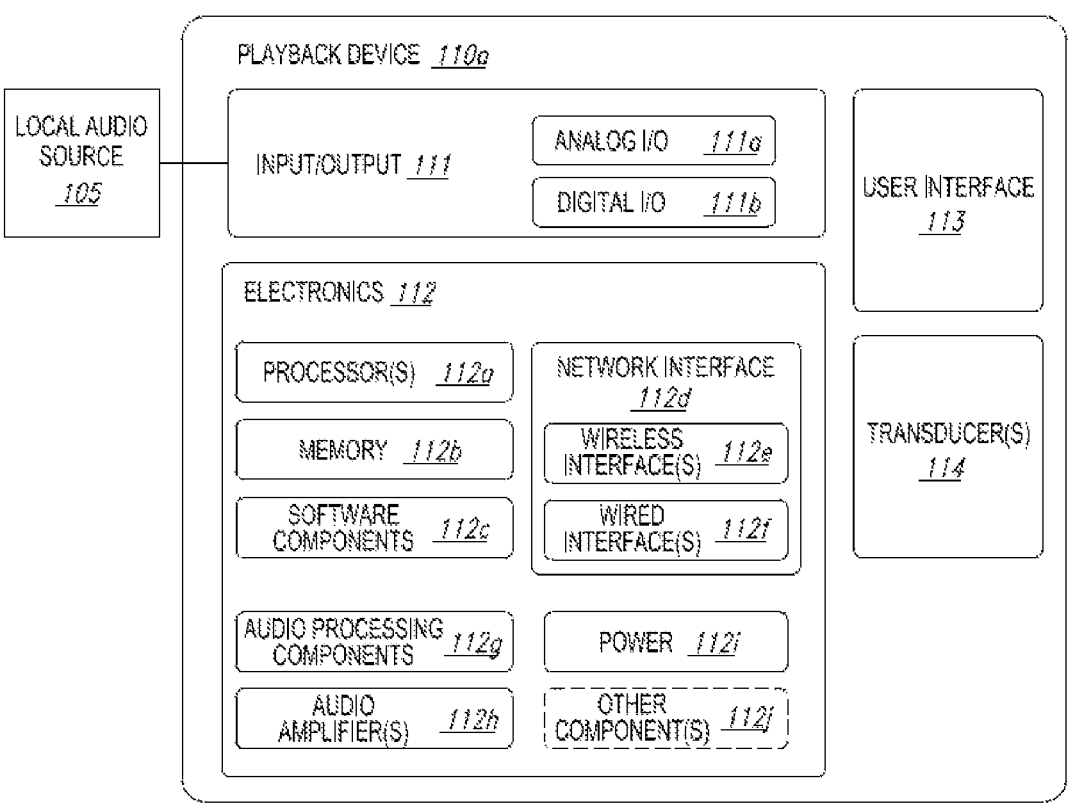
Fig. 1C
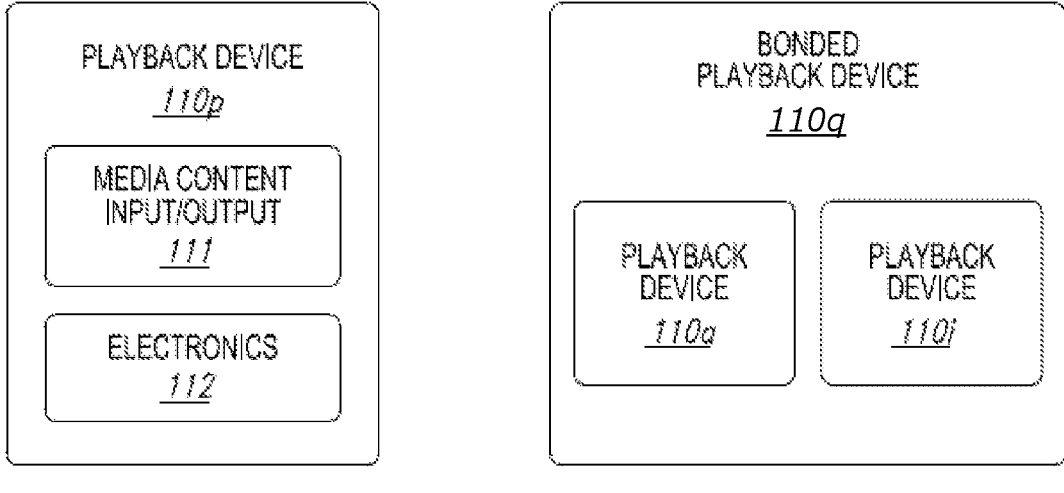
Fig. 1D            Fig. 1E

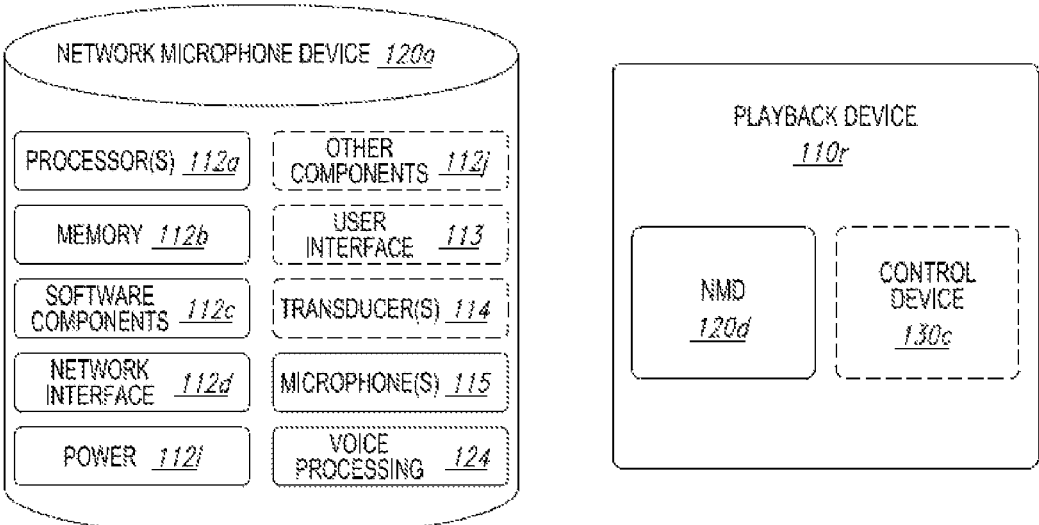
Fig. 1F
Fig. 1G
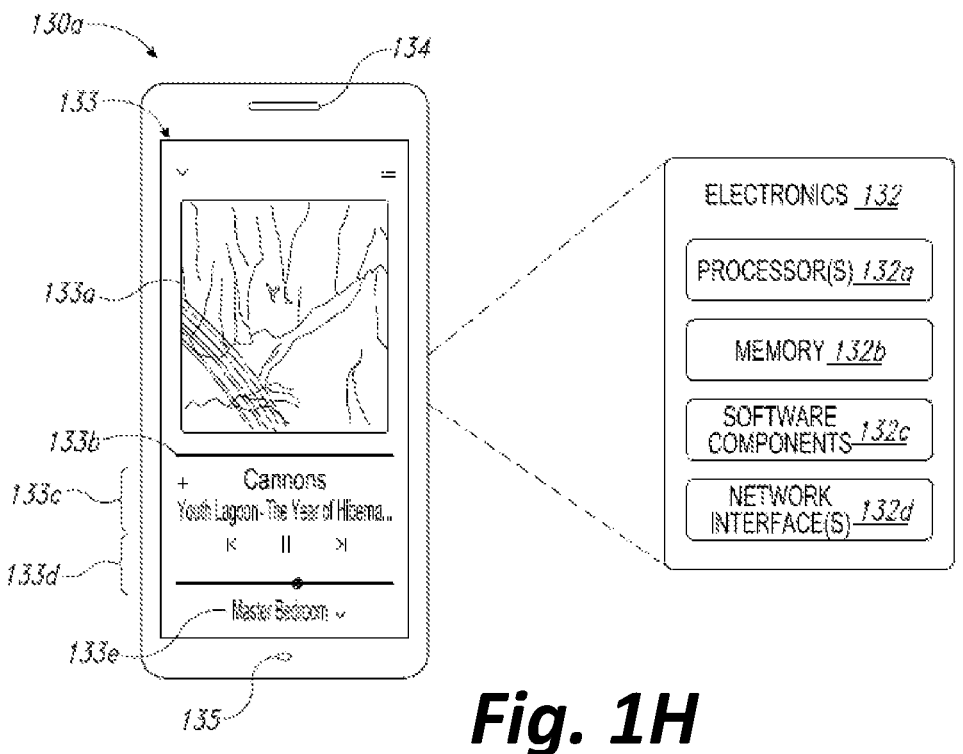
Fig. 1H

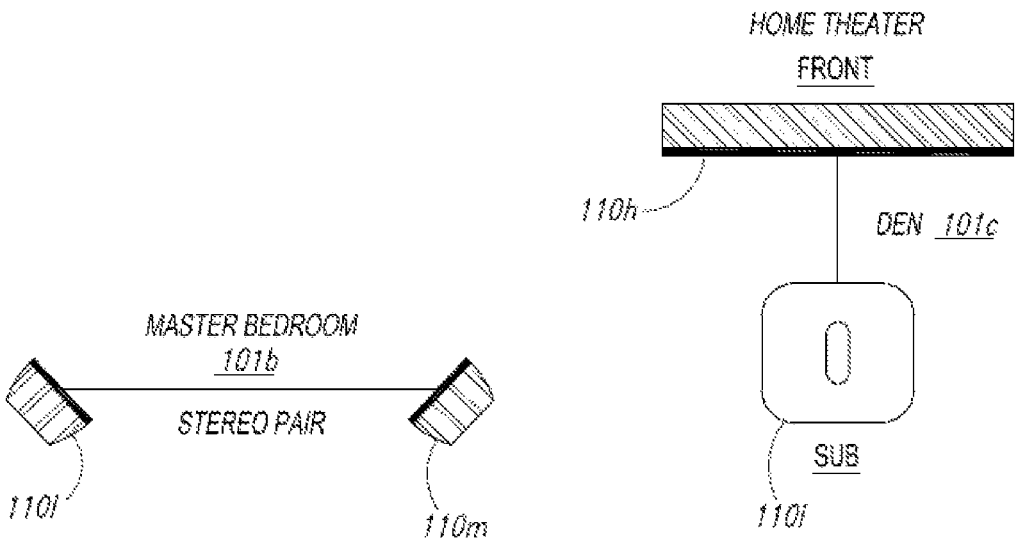
MASTER BEDROOM
*101b*
STEREO PAIR
*110l*                          *110m*
Fig. 1I
HOME THEATER
FRONT
*110h*                DEN   *101c*
SUB
*110i*
Fig. 1J
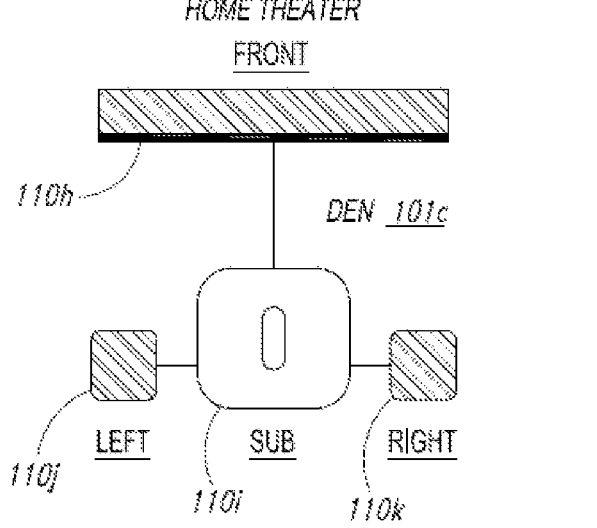
HOME THEATER
FRONT
*110h*              DEN   *101c*
LEFT        SUB        RIGHT
*110j*      *110i*     *110k*
Fig. 1K
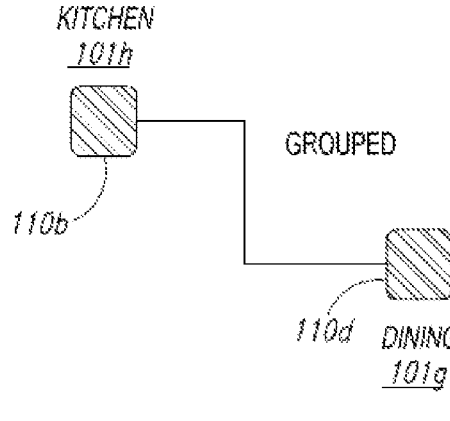
KITCHEN
*101h*
                    GROUPED
*110b*
                    *110d*   DINING
                             *101g*
Fig. 1L

*600*

Transmit a first sound signal comprising a predetermined waveform     *S610*

Receiving a second sound signal comprising at least one reflection of the first sound signal     *S620*

Process the second sound signal to determine a location of a person     *S630*

Select a characteristic of audio reproduction based on the determined location     *S640*

| |
|---|
| Transmit a third sound signal comprising the predetermined waveform when a person is at a known location |

S910

| |
|---|
| Receiving a fourth sound signal comprising at least one reflection of the third sound signal |

S920

| |
|---|
| Store location data indicative of the fourth sound signal and an association between the fourth sound signal and the known location |

S930

SYSTEMS AND METHODS OF USER LOCALIZATION

CROSS REFERENCE TO RELATED APPLICATIONS

The present application is a continuation of U.S. patent application Ser. No. 17/453,633, filed Nov. 4, 2021, now U.S. Pat. No. 11,659,323, which is a continuation of U.S. patent application Ser. No. 16/948,609, filed Sep. 24, 2020, now U.S. Pat. No. 11,184,702, which is a continuation of U.S. application Ser. No. 16/353,774, filed Mar. 14, 2019, now U.S. Pat. No. 10,791,396, which is a continuation of U.S. application Ser. No. 16/149,992, filed on Oct. 2, 2018, now U.S. Pat. No. 10,277,981, which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of a playback device.

FIG. 1D is a block diagram of a playback device.

FIG. 1E is a block diagram of a network microphone device.

FIG. 1F is a block diagram of a network microphone device.

FIG. 1G is a block diagram of a playback device.

FIG. 1H is a partially schematic diagram of a control device.

FIGS. 1-I through 1L are schematic diagrams of corresponding media playback system zones.

Figure 1A:
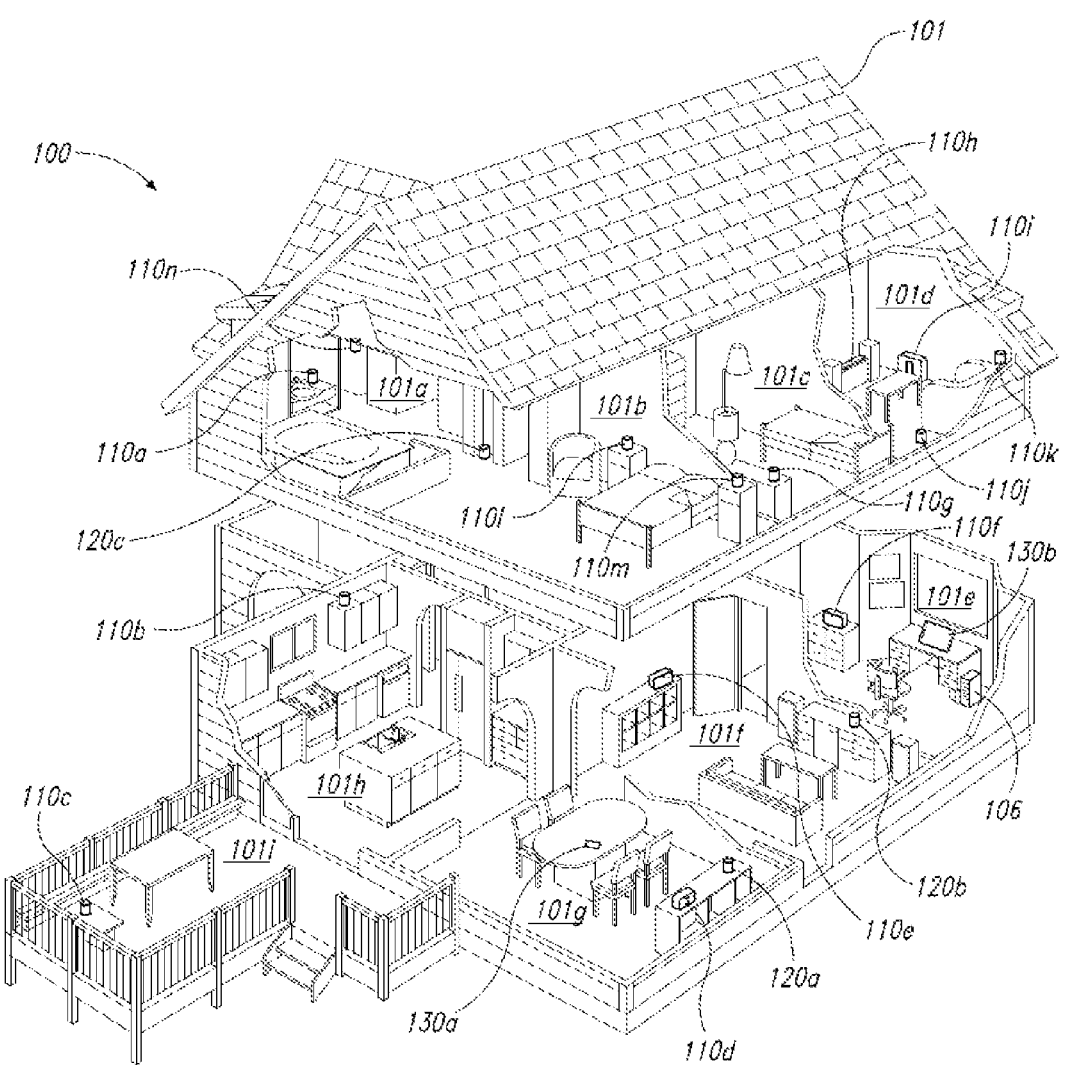
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to selection of audio reproduction characteristics by a playback device based a location of a person. For example, it may be beneficial to adjust audio reproduction based on the location of a listener so that the audio experience is improved for that location. However, it can be difficult for a playback system to determine a location of a person within the playback environment.

In some embodiments, for example, a playback device transmits a first sound signal including a predetermined waveform. The playback device receives a second sound signal including at least one reflection of the first sound signal. The second sound signal is processed to determine a location of a person relative to the playback device, and a characteristic of audio reproduction by the playback device is selected, based on the determined location of the person.

Thus, a person can be located using sound signals and audio reproduction adjusted accordingly to provide an improved audio experience.

In some embodiments, a playback device comprises a transducer configured to generate audio signals; a microphone; and a processing system. The transducer is arranged to transmit a first sound signal comprising a predetermined waveform. The microphone is arranged to receive a second sound signal comprising at least one reflection of the first ultrasound signal. The processing system is arranged to: determine a location of a person relative to the playback device based on the second sound signal; and set a characteristic of audio reproduction by the playback device based on the determined location of the person.

In some embodiment, a non-transitory computer readable medium comprises computer program instructions which, when executed by a processing system, instruct the processing system to: cause an electroacoustic transducer in a playback device to transmit a first sound signal comprising a predetermined waveform; cause a microphone in the playback device to receive a second sound signal comprising at least one reflection of the first sound signal; process the second sound signal to determine a location of a person relative to the playback device; and set a characteristic of audio reproduction by the playback device based on the determined location of the person.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of)

the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1M.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E, and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
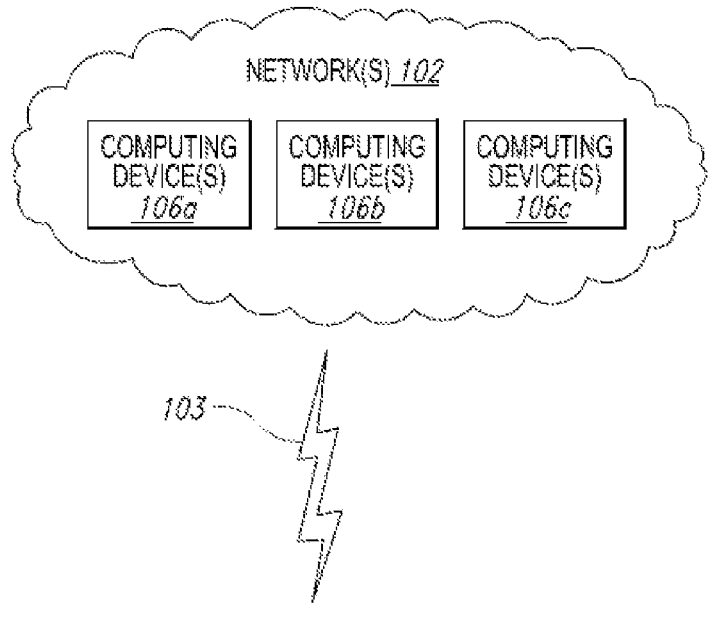
FIG. 1B is a schematic diagram of the media playback system of FIG. 1A and one or more networks.
Figure 1B:
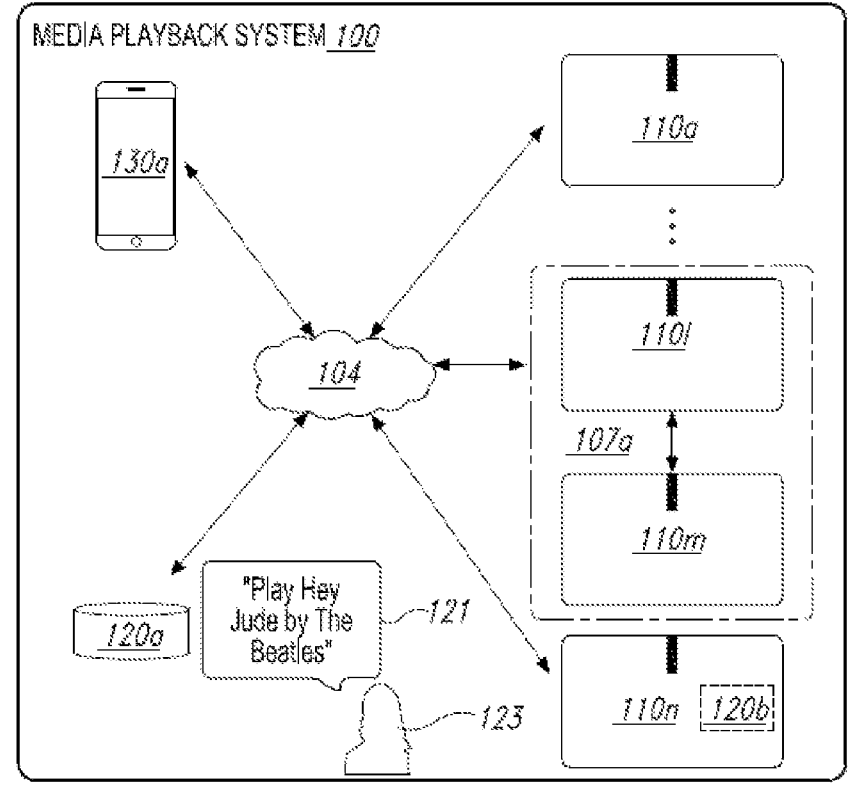

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more) than three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through 1-M.

The media playback system 100 includes the NMDs 120*a* and 120*b*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a*-*c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

e. Suitable Playback Device Configurations

FIGS. 1-I through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone B. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Figure 1M:
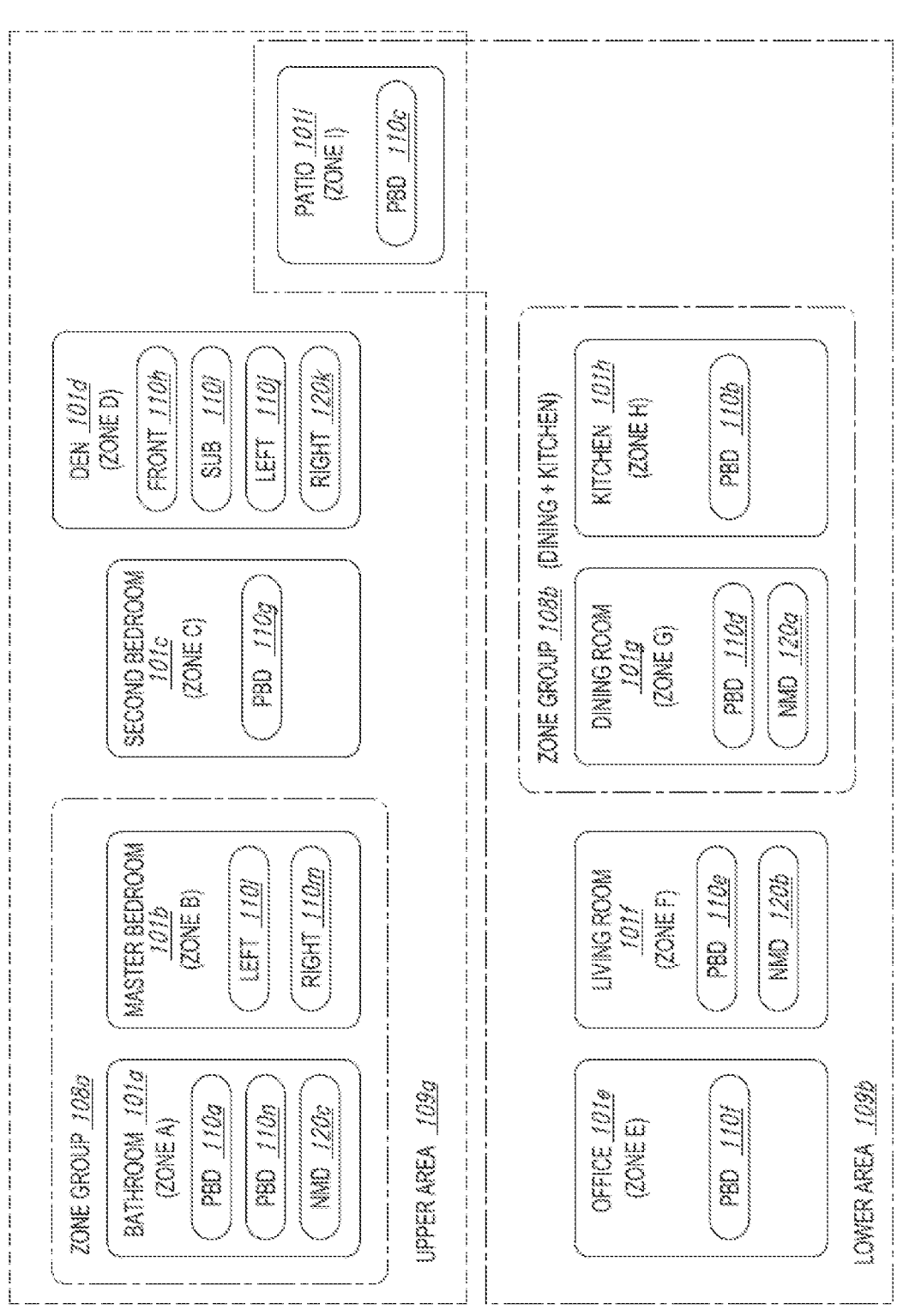
FIG. 1M is a schematic diagram of media playback system areas.

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* of the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
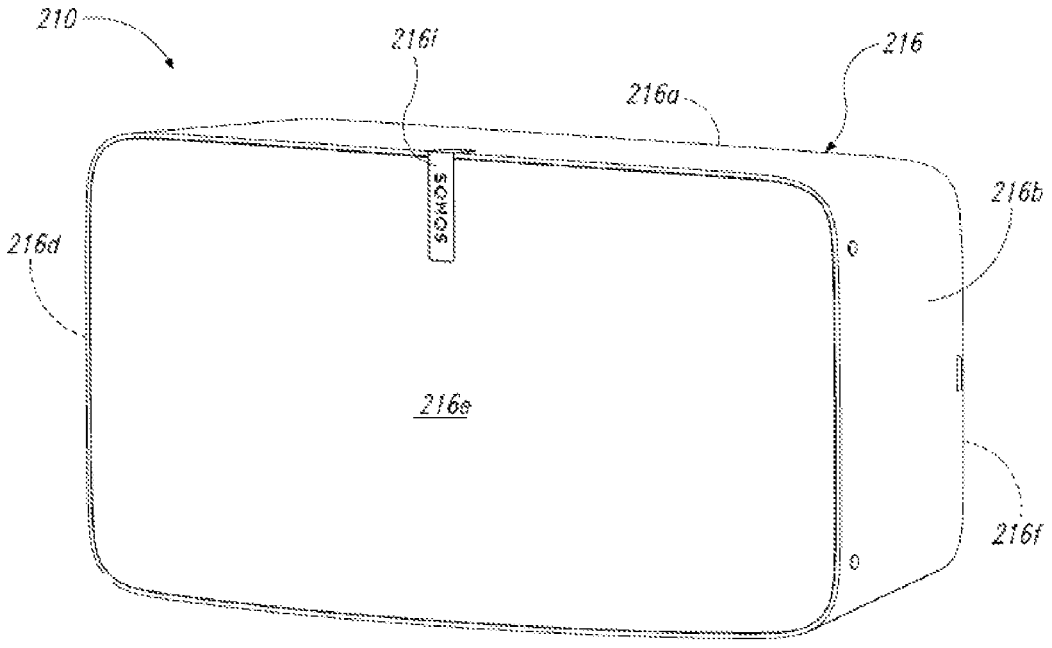
FIG. 2A is a front isometric view of a playback device configured in accordance with aspects of the disclosed technology.
Figure 2B:
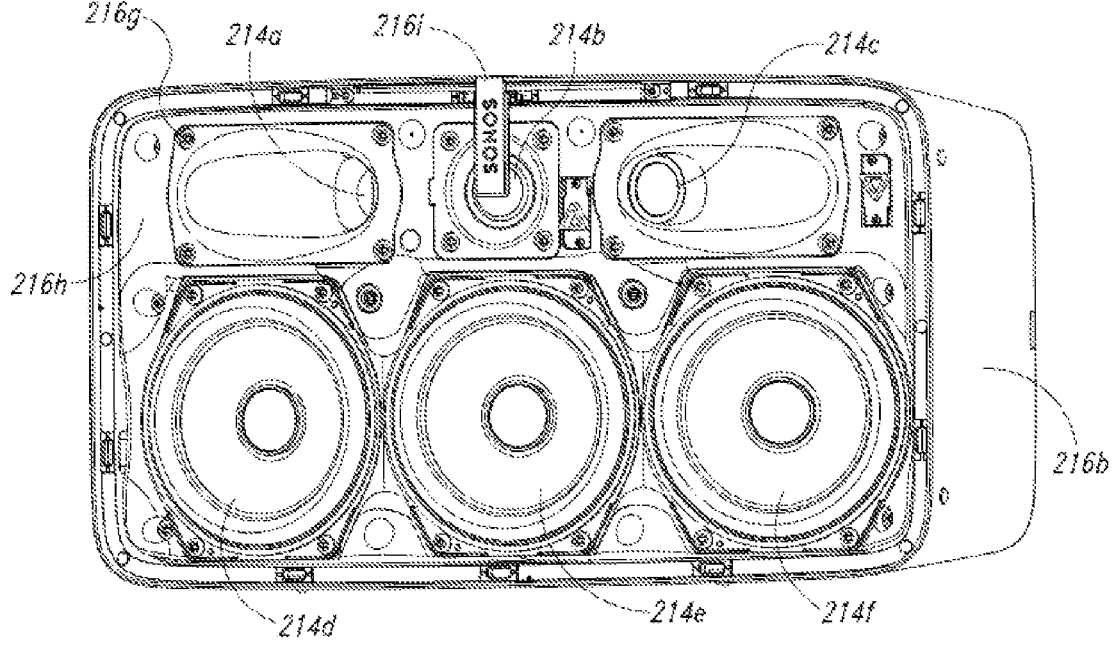
FIG. 2B is a front isometric view of the playback device of FIG. 3A without a grille.
Figure 2C:
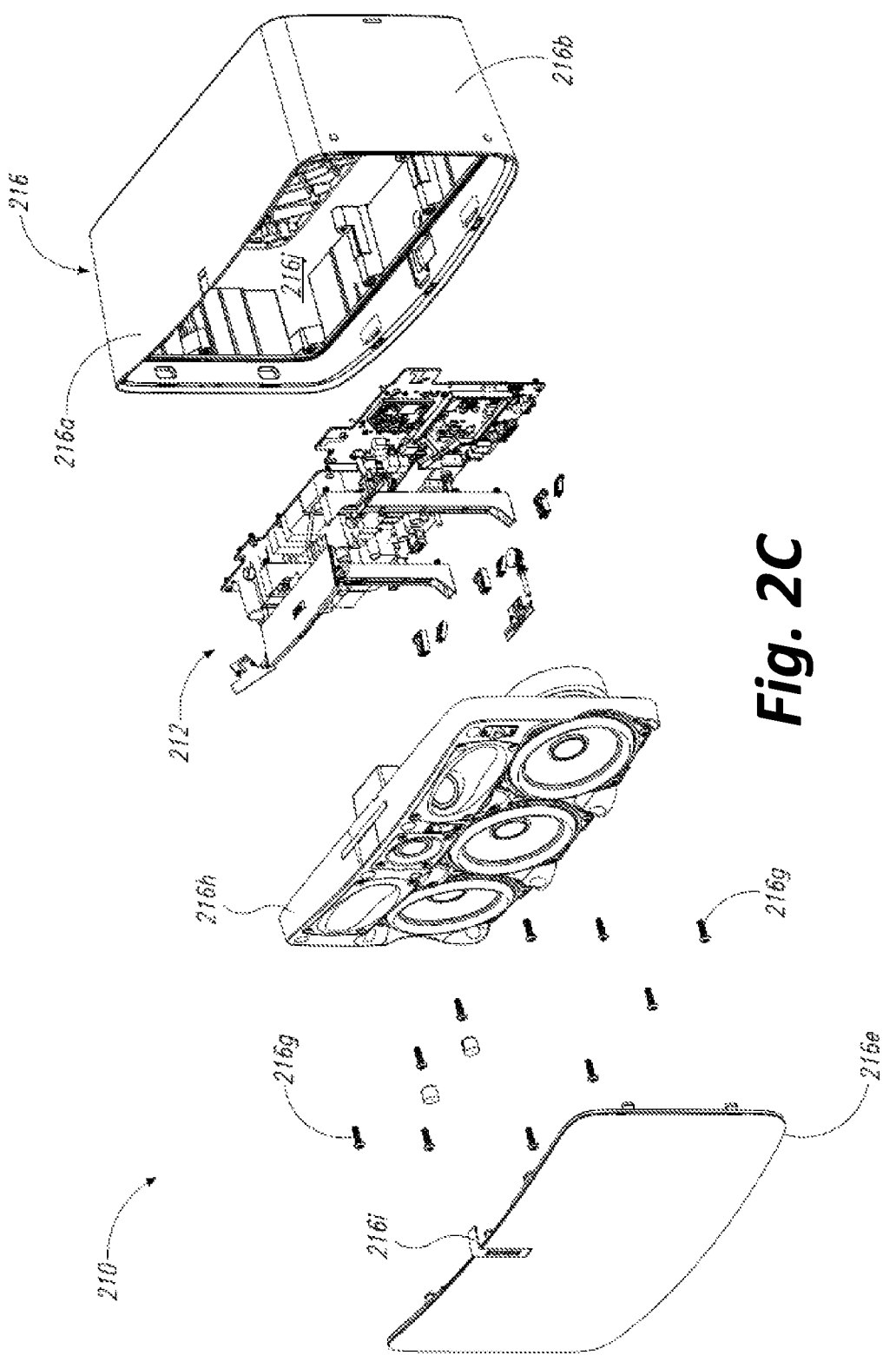
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figures 3A, 3B:
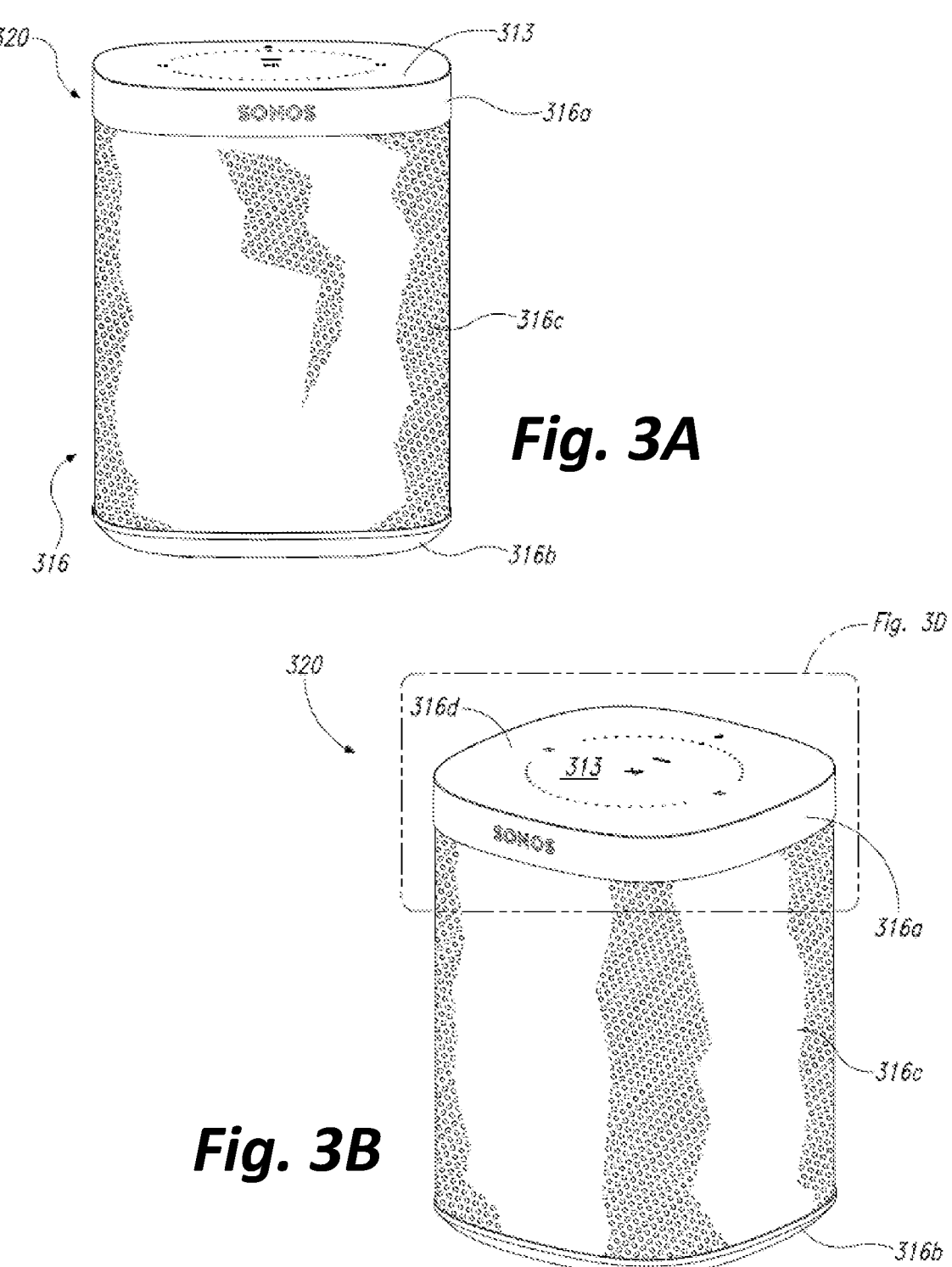
FIG. 3A is a front view of a network microphone device configured in accordance with aspects of the disclosed technology.
FIG. 3B is a side isometric view of the network microphone device of FIG. 3A.
Figure 3C:
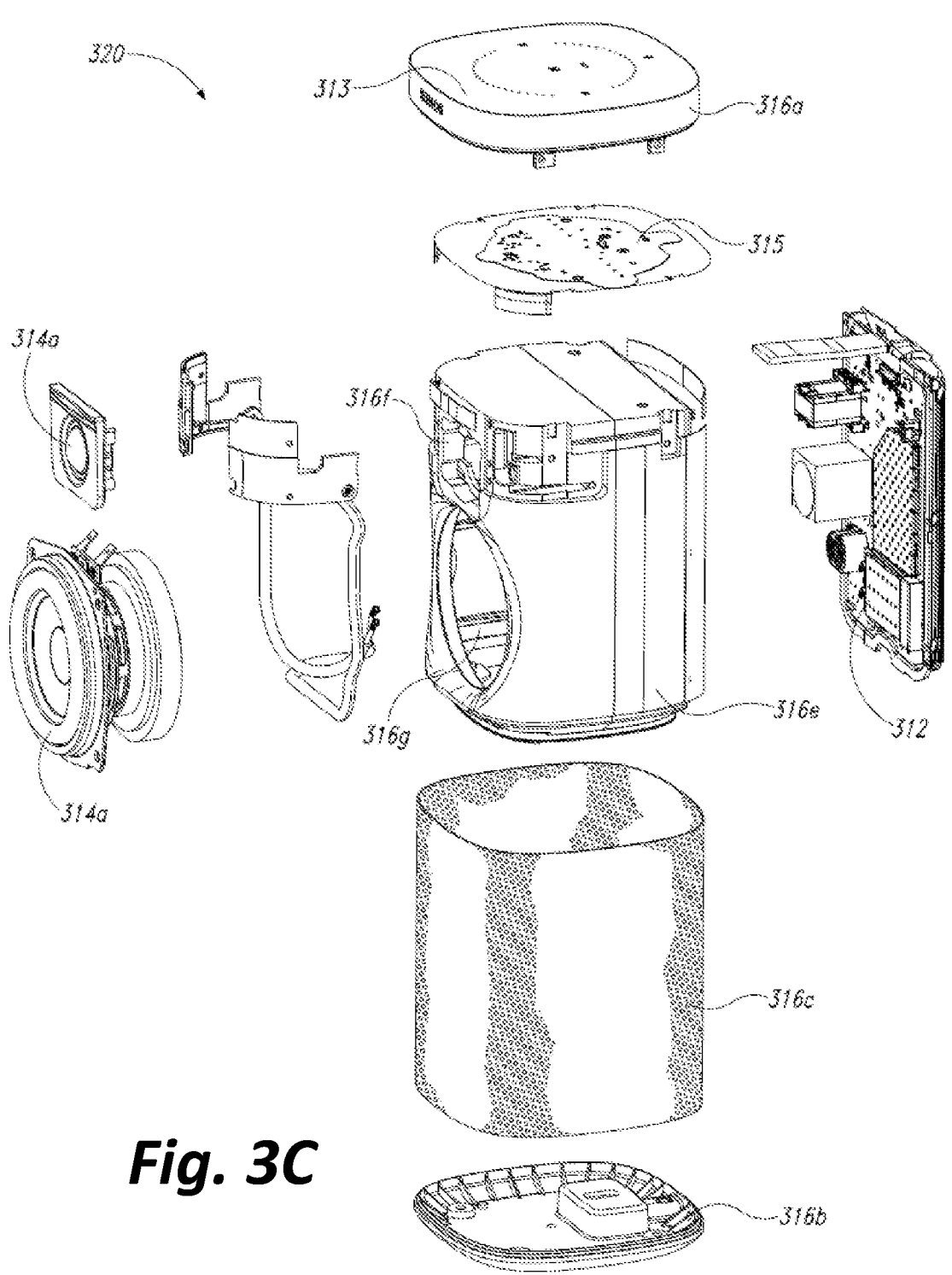
FIG. 3C is an exploded view of the network microphone device of FIGS. 3A and 3B.
Figure 3D:
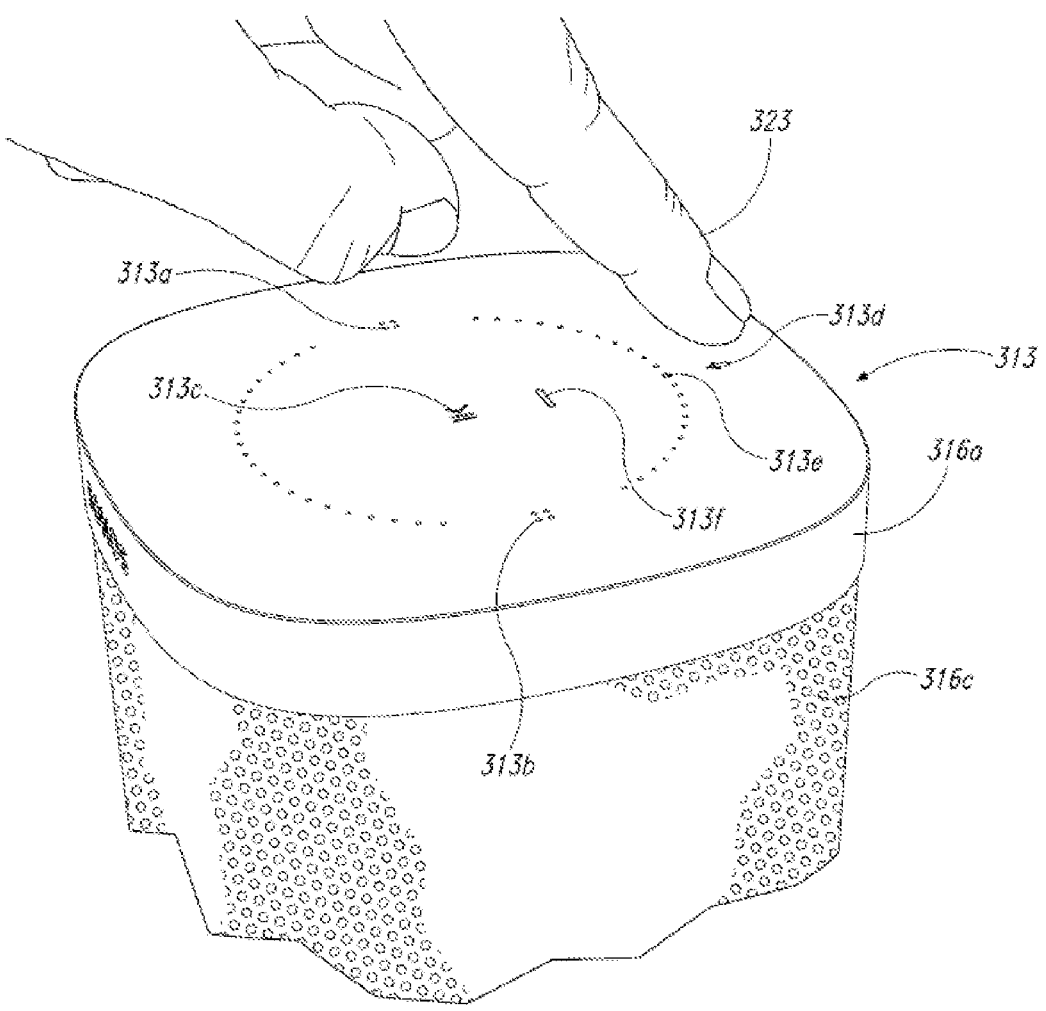
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 315 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figures 3E, 3F:
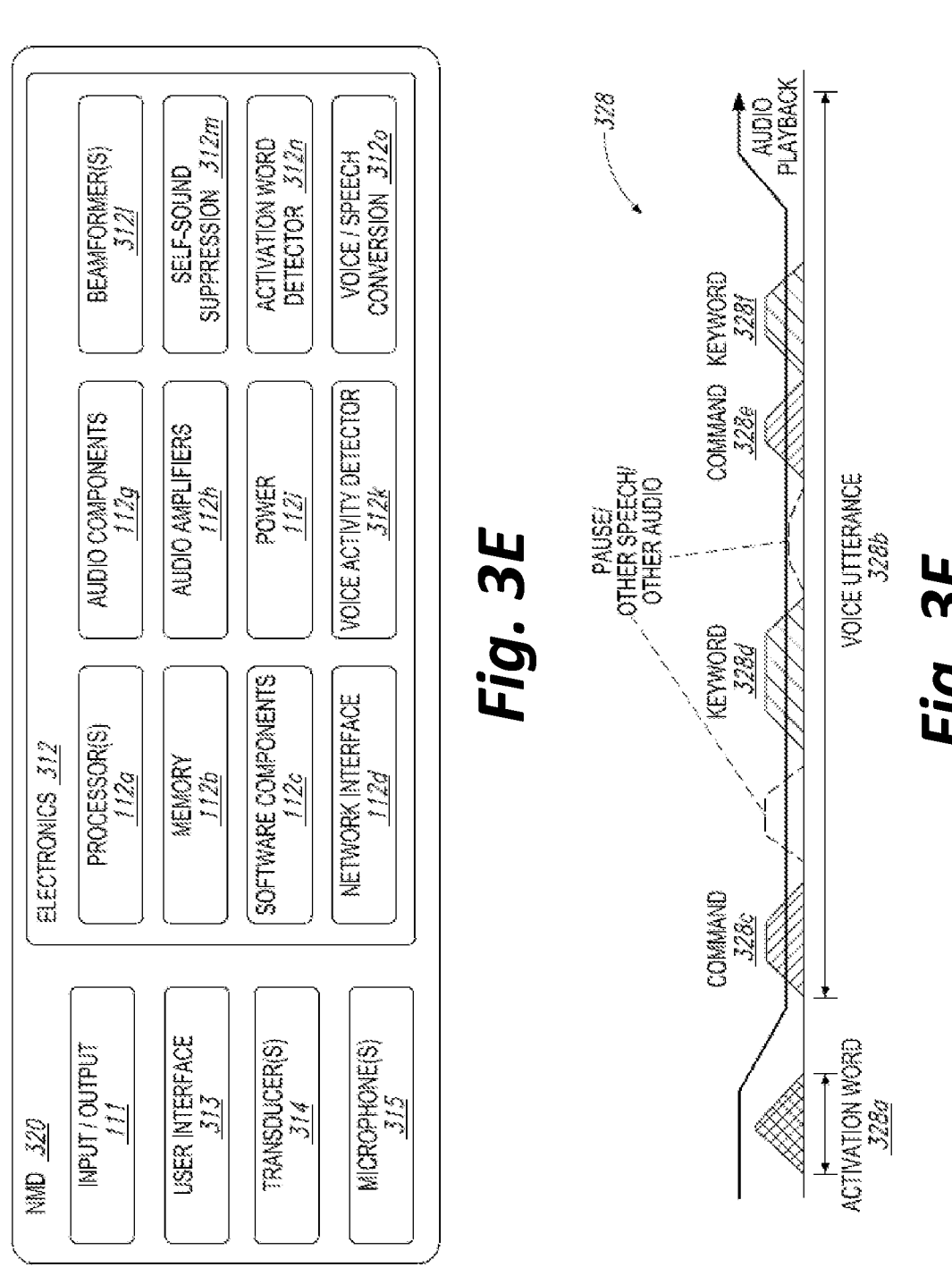
FIG. 3E is a block diagram of the network microphone device of FIGS. 3A-3D
FIG. 3F is a schematic diagram of an example voice input.

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-312*o* are shown as separate components. In some embodiments, however, one or more of the components 312*k*-312*o* are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 312*o* may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 3280. In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

IV. Playback Characteristics Based on Listener Location

Figure 4:
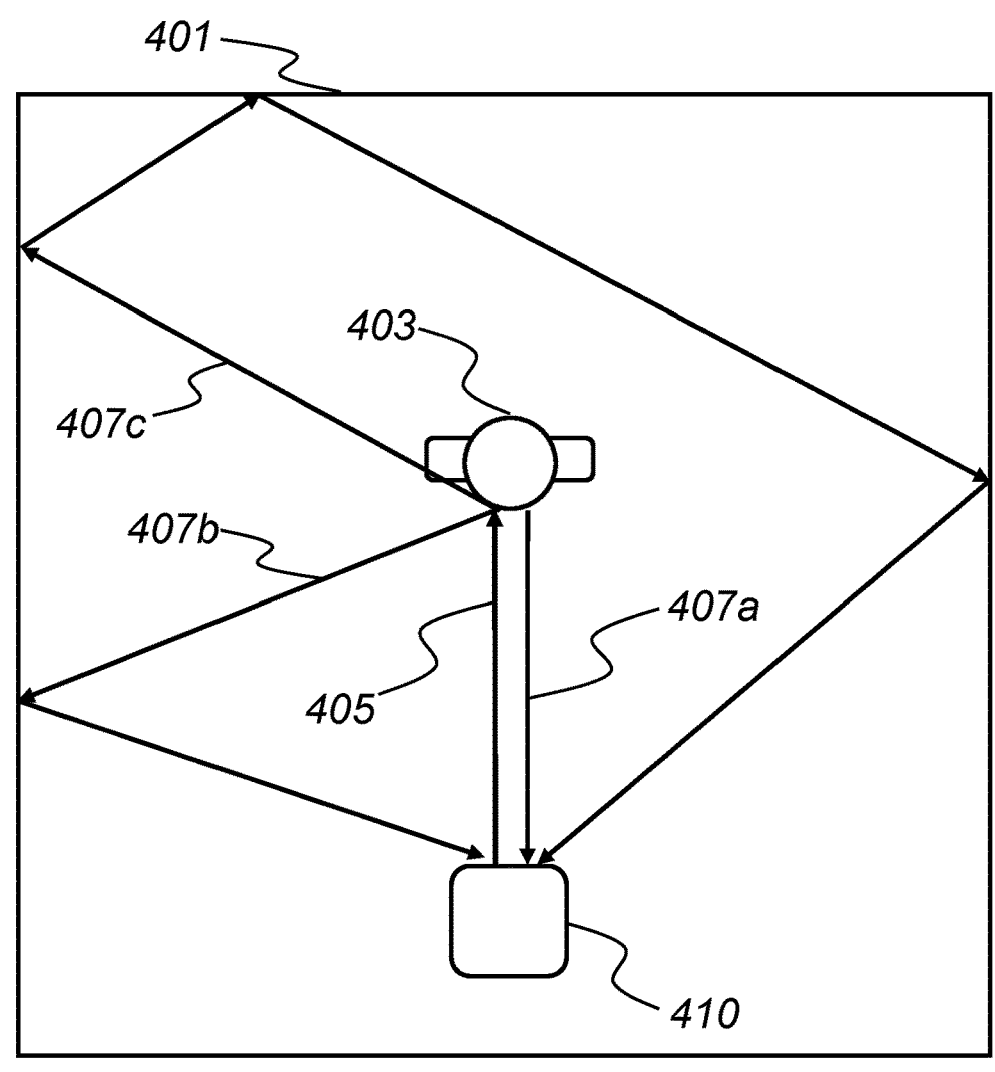
FIG. 4 is a plan view of a playback environment.

FIG. 4 shows a representation of a playback environment 401 occupied by a listener 403. The playback environment 401 in this example is a living room 110f (FIG. 1A). Other examples may be applied to any other environment in which playback devices are installed. For clarity, the playback environment 401 is shown as being substantially rectangular, but it will be appreciated that other playback environments may have different sized and/or shapes, and may contain any number of additional features, for example furniture and/or doorways, which may affect the acoustic properties of the playback environment. Other examples of playback environments include interiors of vehicles and/or commercial settings, as discussed above. A playback environment may correspond to a playback zone in a playback system such as that described above with reference to FIG. 1A, though in other examples a playback environment may only be part of a playback zone, or alternatively may incorporate multiple playback zones.

Figure 5:
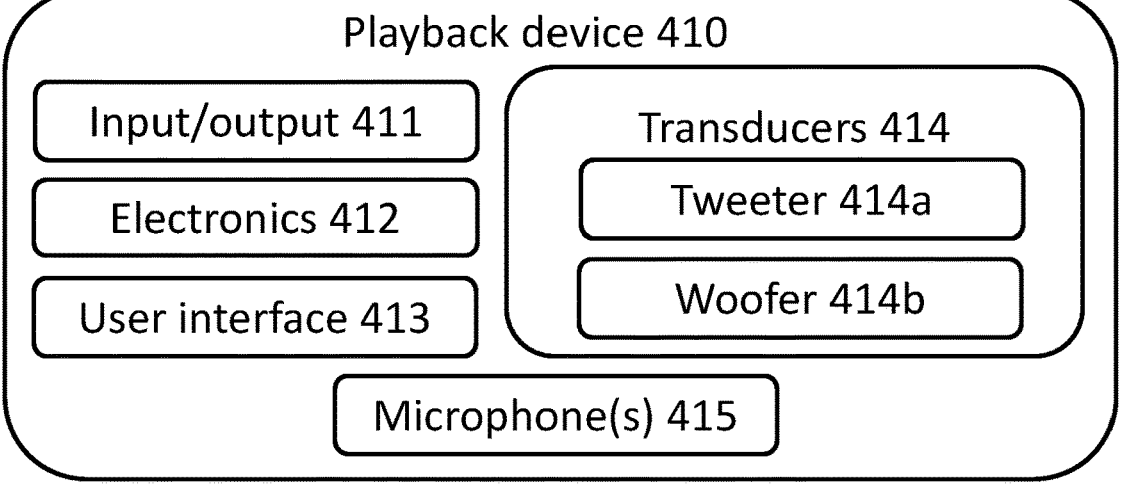
FIG. 5 is a block diagram of a playback device.

The playback environment 401 contains a playback device 410 configured to perform audio reproduction from a media source. The playback device is substantially as described above with reference to FIG. 1C but includes microphones. As shown in FIG. 5, the playback device 410 includes input/output 411, electronics 412, a user interface 413, one or more transducers 414, and one or more microphones 415. In this example, the transducers 414 include a tweeter 414a that is configured to generate sound signals having a relatively high frequency (for example between about 2 kHz and about 22 kHz) and a mid-woofer 414b that is configured to generate low- to mid-frequency acoustic waves (for example, acoustic waves having a frequency of between about 40 Hz and about 2 kHz). Other examples of playback devices configured to perform the methods described hereafter may include more or fewer transducers, and may include other types of transducer, for example a subwoofer, or may omit any of the above-mentioned types of transducer. Furthermore, the methods described hereafter may be performed by a bonded playback device as described above with reference to FIG. 1E.

The electronics 412 of the playback device 410 in this example include equivalent components to the electronics 112 of the playback device 110 described above with reference to FIG. 1C, and additionally include audio processing components for processing sound signals received by the one or more microphones 415. It is noted that the methods described hereafter may be performed by an NMD incorporating a playback device, or by a playback device incorporating an NMD. For example, the NMD 320 (FIG. 3C), which includes one or more transducers 314 that may be used for audio reproduction, may be configured to perform the methods described hereafter.

The playback device 410 is arranged to select a characteristic of audio reproduction based on a location of a person, for example listener 403, with respect to the playback device 403. Examples of characteristics that may be selected include a volume of audio reproduction or equalization levels for audio reproduction. Further examples of characteristics of audio reproduction will be described in detail hereafter. As will be apparent from these examples, selecting a characteristic of audio reproduction based on a location of a listener may result in an improved or enhanced listening experience for the listener, and/or further additional or improved aspects of user experience for the listener.

Figure 6:
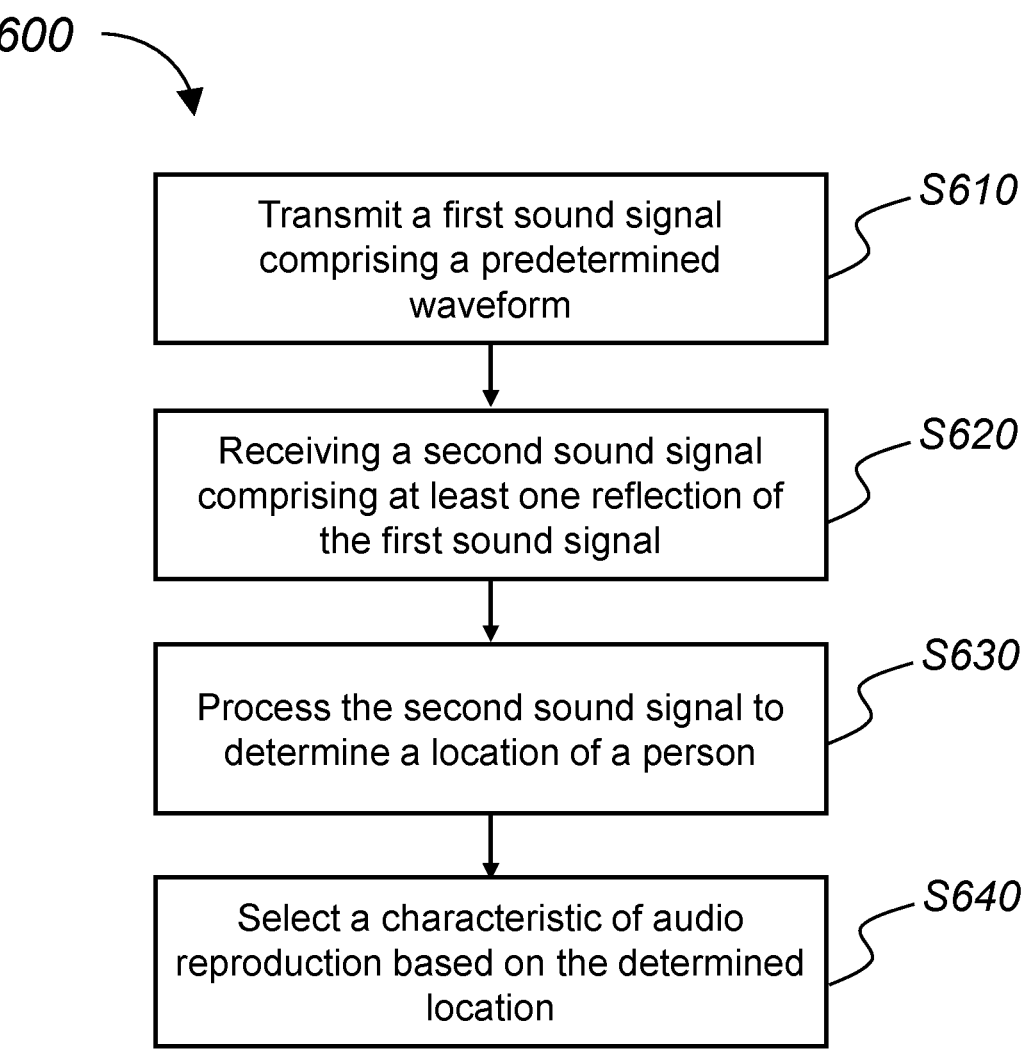
FIG. 6 is a flow diagram representing a method for selecting a characteristic of audio reproduction based on a determined location of a person.

FIG. 6 is a flow diagram of a method 600 in which the playback device 410 selects a characteristic of audio reproduction based on a location of a person relative to the playback device 410. The playback device 410 transmits, at S610, a first sound signal containing a predetermined waveform. In this example, the first sound signal is an up-chirp which is a sound signal having a frequency that increases with time in a predetermined manner. Other examples of sound signals that may be transmitted include a down-chirp (a sound signal having a frequency that decreases with time in a predetermined manner), constant-frequency pulse, or Frequency-Modulated Continuous Wave (FMCW) signals. In the example of FIG. 4, a first sound signal 405 is transmitted by the playback device 410 into the playback environment 401. The first sound signal 405 is represented in FIG. 4 as a ray. It will be appreciated that a ray is an idealized model of a sound wave, and corresponds to a direction of energy flow that is locally perpendicular to wave fronts of the sound wave.

In the present example, the first sound signal 405 is an ultrasonic sound signal generated by the tweeter 414a. An ultrasonic sound signal has a frequency that is higher than the highest frequency of sound that is audible to an average person, for example higher than 20 kHz. It is noted that the highest audible sound varies significantly between people, so for the purpose of the present disclosure, an ultrasonic sound signal may be considered to have a frequency that remains above 20 kHz for the duration of the sound signal. As mentioned above, the tweeter 414a is configured to generate sound signals having a frequency of between about 2 kHz and 22 kHz, and therefore is configured to generate ultrasonic sound signals with a frequency of between about 20 kHz and 22 kHz. Transducers such as tweeters may be manufactured to be able to generate sound signals outside the audible range of human hearing in order to reduce detrimental effects associated with roll-off near the extremes of the audible hearing range. In the present example, the first sound signal 405 is an ultrasonic chirp with a duration of about 10 ms, with a frequency that rises in a predetermined manner within a range of between about 20 kHz and 22 kHz. In other examples, however, the tweeter 414 is configured to generate sound signals having frequencies greater than 22 kHz (e.g., sound signals having frequencies 25 kHz and higher).

Under standard temperature and pressure (STP) conditions, ultrasound waves in the frequency ranges discussed above typically have wavelengths less than about 2 cm. Due to the relatively short wavelength of ultrasonic sound waves relative to the size of many transducers (including tweeter 414a) and/or apertures through which sound signals are emitted, angular dispersion or angular spread of ultrasonic sound signals generated by such transducers is limited to a relatively narrow angle (e.g., less than about 10 degrees from normal, less than about 5 degrees from normal, or less than about 1 degree from normal). As a result, ultrasonic sound signals may be transmitted as a relatively narrow beam, in contrast to lower frequency sound signals for which diffractive effects cause wide-angle dispersion. This makes ultrasonic sound waves (as well as high-frequency audible sound waves, for example audible sound waves with a frequency greater than about 8 kHz, about 10 kHz, about 12 kHz, about 14 kHz, or about 18 kHz) suitable for use in the present method, for the reasons described hereafter.

Returning to the method of FIG. 6, the playback device 410 receives, at S620, a second sound signal using the one or more microphones 415. The second sound signal contains at least one reflection of the first sound signal. In the example of FIG. 4, three reflections 407a, 407b, and 407c (collectively referred to as reflections 407) of the first sound signal 405 are shown, each reflection represented by a ray. The first reflected ray 407a corresponds to a reflection of the first sound signal 403 in which the first sound signal 403 is normally incident on part of the listener 403, and accordingly is reflected directly back to the playback device 410. The second reflected ray 407b corresponds to a reflection of the first sound signal 403 in which the first sound signal 403 is obliquely incident on part of the listener 403, and is reflected indirectly back to the playback device 410, having first been reflected off the left hand wall of the playback environment 401. The third reflected ray 407c also corresponds to a reflection of the first sound signal 403 in which the first sound signal 403 is reflected indirectly back to the playback device 410, in this case having first been reflected off three walls of the playback environment 401. In reality, the propagation of sound waves in the playback environment 410 will be complicated by, for example, diffractive effects, and many other reflections will be present in a reverberant environment such as the playback environment 410. The reflected rays 407 are included for illustrative purposes only.

Although the number of reflections of the sound signal 405 is likely to be large, the relatively narrow beam angle of the first sound signal 405 reduces the likelihood that direct reflections of the first sound signal 405 from the back wall or side walls (shown in FIG. 4 as the left, right, and lower walls) are present because the beam may be blocked before reaching them. In the specific arrangement shown in FIG. 4, the first reflected ray to reach the playback device 410 is the ray 407a reflected directly from the listener 403. In other arrangements, rays reflected directly or indirectly from other objects of features within a playback environment may reach a playback device before any ray directly reflected from a person. In some arrangements, for example where a listener is not located within a path of a beam transmitted by a playback device, there may not be any significant direct reflection from the listener.

The second sound signal is processed, at S630, to determine a location of a person relative to the playback device 410. In the present embodiment, audio processing components of the electronics 412 of the playback device 410 process the second sound signal. However, playback devices in other embodiments may alternatively be arranged to send data to a remote computer system for remote processing. In some of these examples, a playback device is arranged to transmit, using a network interface, data indicative of a second sound signal to a computing system for remote processing. The computing system is arranged to process the second sound signal and transmit, using the network interface, data indicative of the location of the person relative to the playback device. The playback device is arranged to receive the data indicative of the location of the person, thereby to determine the location of the person relative to the playback device.

A location of a person may be determined in a variety of ways. In some examples, a feature within a received second sound signal is identified as being a reflection of a transmitted signal by a person. An example of a feature within a received sound signal is a reflection of all or part of a predetermined waveform, or a peak in amplitude in the received signal. A reflection of a transmitted signal by a person may be direct or indirect, as discussed above with reference to FIG. 4. If a feature is identified as being a direct reflection of a transmitted signal by a person, a distance from the playback device to the person can be determined using echo-location or range-finding techniques, whereby the distance is determined using the equation d=ct/2, where d is the distance from the playback device to the determined location of the person, t is the time between transmission of a feature within the transmitted signal and receipt of a corresponding feature within the received signal, and c is the speed of sound in air (approximately 340 m/s under STP conditions). Identifying a feature as a direct reflection by a person may include comparing a received sound signal with a baseline signal received when no person is present in the playback environment, and identifying from the comparison one or more additional features in the sound signal received when a person is present in the playback zone. The first such feature to appear in the received signal may be determined to be a direct reflection by a person. For examples where echo-location techniques are employed to determine a location of a person, sound signals containing a predetermined FMCW (for example, a chirp) allow for improved distance resolution, as cross-correlation may be used to match the reflected signal with a reference signal containing the FMCW with a given temporal offset.

The baseline signal may be a signal transmitted at a time when no one is likely to be in the room, such as a time between midnight and 6 am, between 1am and 5 am, or between 2 am and 4 am, for example at about 3 am, about 4 am, or about 5 am. The comparison may identify differences from the baseline signal, e.g. by subtracting the baseline signal from the received signal. Using a baseline signal can remove the effects of both the self-response of the playbacks device and the response from furniture and other items in the environment. In some examples, the baseline signal may be transmitted and measured periodically, for example once a day, once a week, or once a month to identify potential changes such as changes in the position of furniture and/or other items in the environment. The baseline signal may be established from a single measurement of from a plurality of measurements, e.g. by taking an average.

Figure 7:
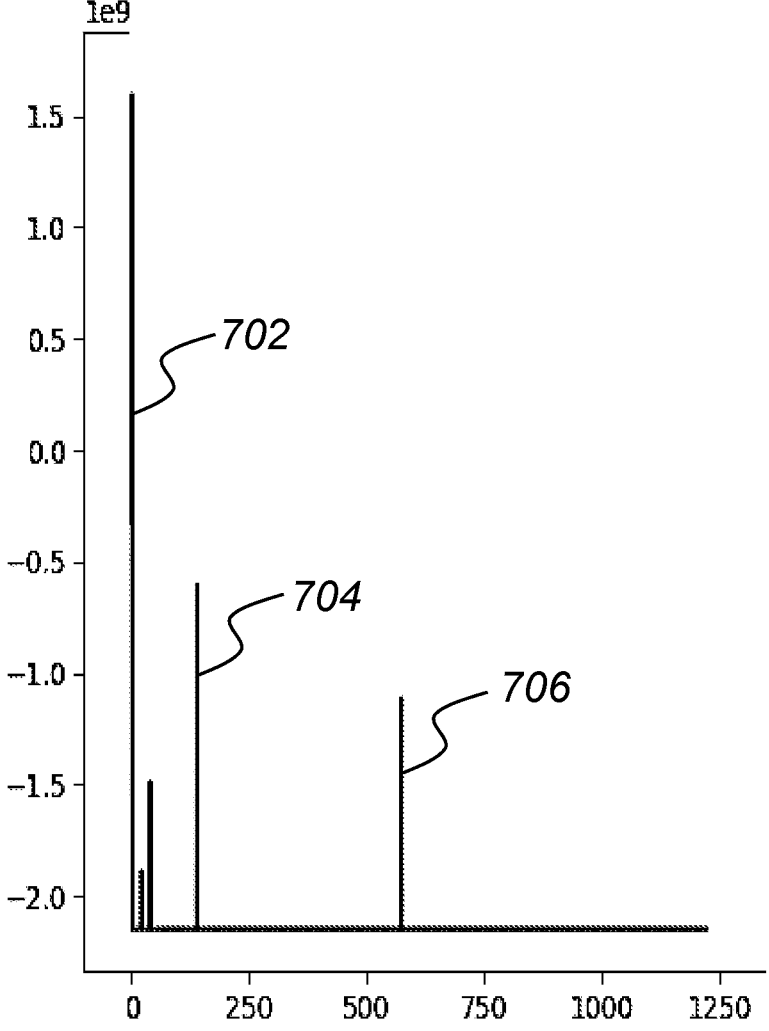
FIG. 7 is a graph of data output by a multi-stage noise-shaping (MASH) modulator.

FIG. 7 shows an example of 1250 data samples generated by passing a sound signal received by a playback device through a multi-stage noise-shaping (MASH) modulator. Each of the discrete peaks in the data corresponds to an amplitude peak in the received second sound signal. In this example, the first peak 702 corresponds to a self-response of the playback device caused by a transducer of the playback device transmitting a first sound signal. The second peak 704 corresponds to a direct reflection of the first sound signal by a person (similar to the reflection 407a of FIG. 4). The third peak 706 corresponds to an indirect reflection of the first sound signal by a person (similar to the reflection 407b of FIG. 4).

In some examples, processing a second sound signal to determine a location of a person relative to a playback device includes disregarding a portion of the second sound signal corresponding to a self-response of the playback device. A playback device may have a significant self-response for at least a part of the frequency range generated by the playback device. A self-response may be, for example, a resonance of all or part of the playback device induced by a transducer of the playback device generating a sound signal, and/or internal reflections of a generated sound signal within the playback device. In some examples, the self-response may be the most prominent feature of a sound signal received by a microphone of the playback device. This is in contrast with devices solely or primarily designed to perform echo-location, for example sonar transceivers, which are designed to minimize self-response. Disregarding a portion of the received second sound signal corresponding to a self-response of the playback device may improve the accuracy with which a location of a person is determined, especially where determining a location of a person involves determining a correspondence between the received second sound signal and stored signal data, examples of which will be described in detail hereafter. Disregarding a portion of the received sound signal may include disregarding a portion of the signal having a predetermined duration. The predetermined duration for a given playback device will depend on the self-response of the given playback device, and may be different for different models of playback device. In some examples, the microphone is activated only after the portion of the second sound signal is expected to be received, resulting in the portion being disregarded automatically.

As discussed above with reference to FIG. 1C, some playback devices incorporate multiple microphones, for example as part of a microphone array. In such examples, signals received from two or more of the microphones may be processed to determine an angular component of a location from which a signal is reflected. In some examples, two microphones each receive a signal containing at least one reflection of a transmitted first sound signal. The two received signals are processed to determine a delay between the two received signals. For example, a cross-correlation may be determined between the two signals for a range of candidate delays, and the delay giving rise to a highest value of the cross-correlation is determined to be the delay between the two signals. Signals containing FMCWs are particularly suitable for such applications, as an FCMW can be arranged such that an autocorrelation of the FCMW (a cross correlation between the FCMW and a delayed copy of the FCMW) is uniquely maximized for a delay of zero. This is in contrast to signals having fixed frequencies, in which signal offsets corresponding to a multiple of a wavelength may give rise to further autocorrelation maxima.

Figure 8:
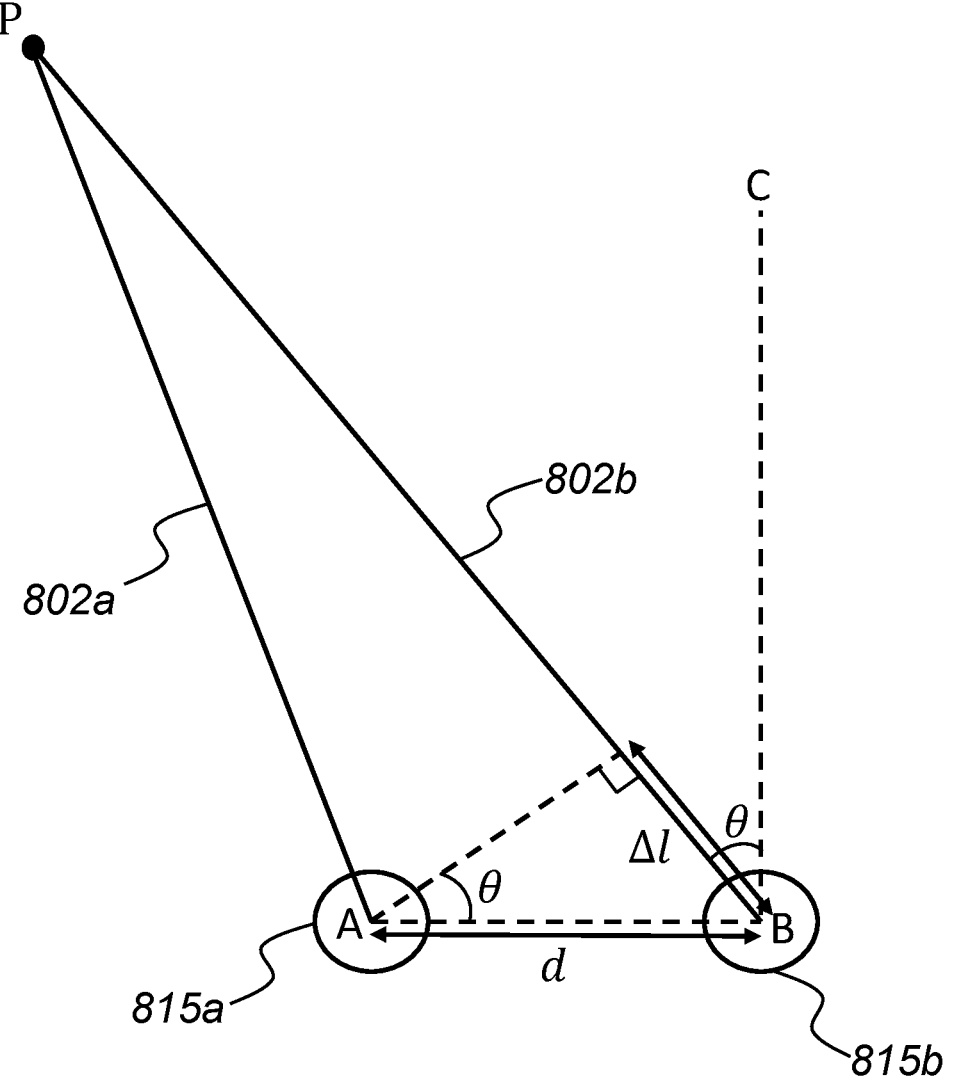
FIG. 8 is a schematic diagram depicting two microphones receiving reflections of a sound signal.

FIG. 8 shows a top-down view in which a first sound signal transmitted by a playback device and containing a predetermined waveform is reflected from a person P in a playback environment. Two microphones 815a and 815b, which have apertures separated by a distance d (as measured, in this example, between the centers of the apertures) each receive a respective sound signal containing a reflection of the transmitted sound signal by the person P. The first microphone 815a receives a sound signal corresponding to the reflected ray 802a, and the second microphone 815b receives a sound signal corresponding to the reflected ray 802b. A line BC passes through the center of the aperture of the second microphone 815b, and is perpendicular to a line AB passing through the centers of the apertures of the microphones 815a and 815b. An angle $\theta$ between the line BP (corresponding to the direction of the reflected ray 802b) and line BC is an angular component of the location of the person P from the playback device. In this example, the distance BP between the person and the second microphone 815b is much greater than the distance d between the microphones 815a and 815b, and the angle $\theta$ is therefore approximately equal to an angular component of the location of the person P from any point on the line segment AC between the two microphones 815a and 815b. In many examples, the distance between two microphones of a playback device is small (for example less than 10 mm or less than 5 mm), and therefore it is expected that the distance from the playback device to a listener will be much greater than the distance between the two microphones.

The difference in length between the line segment BP and the line segment AP is $\Delta l$, corresponding to the difference in path length between the rays 802a and 802b. The difference $\Delta l$ in path length is related to a delay $\Delta t$ between the sound signals received by the two microphones 802a and 802b by the equation $\Delta l = v\Delta t$, where v is the speed of sound in air (approximately 340 m/s under STP conditions). The angular component $\theta$ of the location of the person P from the playback device is given by $\theta = \arcsin(\Delta l/d) = \arcsin(v\Delta t/d)$, where arcsin denotes the inverse of the sine function for angles $\theta$ within the interval $-\pi/2 < \theta < \pi/2$ (measured in radians). By processing the sound signals received by the microphones 815a and 815b, for example by determining a cross-correlation to determine the delay $\Delta t$ and then using the above equation to calculate $\theta$, an angular component of the location P of the person may be determined.

In many situations, identifying a peak in signal amplitude as being caused by a direct reflection from a person is not straightforward, for example due to reflections from other objects in a reverberant environment. In such cases, range-finding techniques and/or delay analysis as described above may be less suitable for determining a location of a person with respect to a playback device. An alternative method of determining a location of a person involves storing location data or calibration data associating stored sound signal data received when a person is at known locations within the playback environment. An unknown location of a person is then determined to be the same as the known location associated with the stored signal, based on a correspondence between a received second sound signal and the stored sound signal. For example, a playback device may store location data associating each of a set of stored sound signals with a respective location of a person. Upon receiving a second sound signal containing one or more reflections of a transmitted first sound signal, a location of the person may be determined based on a best correspondence between the received second sound signal and one of the stored sound signals. A correspondence can be measured according to any suitable metric, and a location of a person may be determined only if a metric score for a received second sound signal is higher than a predetermined threshold value.

In some examples, configuration data is stored corresponding to a sound signal received when no person is present in the playback environment. If a best correspondence with a received second signal is determined to be with this configuration data, it is determined that no person is in the playback environment. This method avoids a location of a person being erroneously determined when no person is in the playback environment. Some examples may also apply the determination that a person is unlikely to be present in the playback environment to take appropriate action, such as ceasing or pausing audio reproduction by playback devices associated with the playback environment.

Figure 9:
FIG. 9 is a flow diagram representing a method for configuring a playback device.
Figure 9:
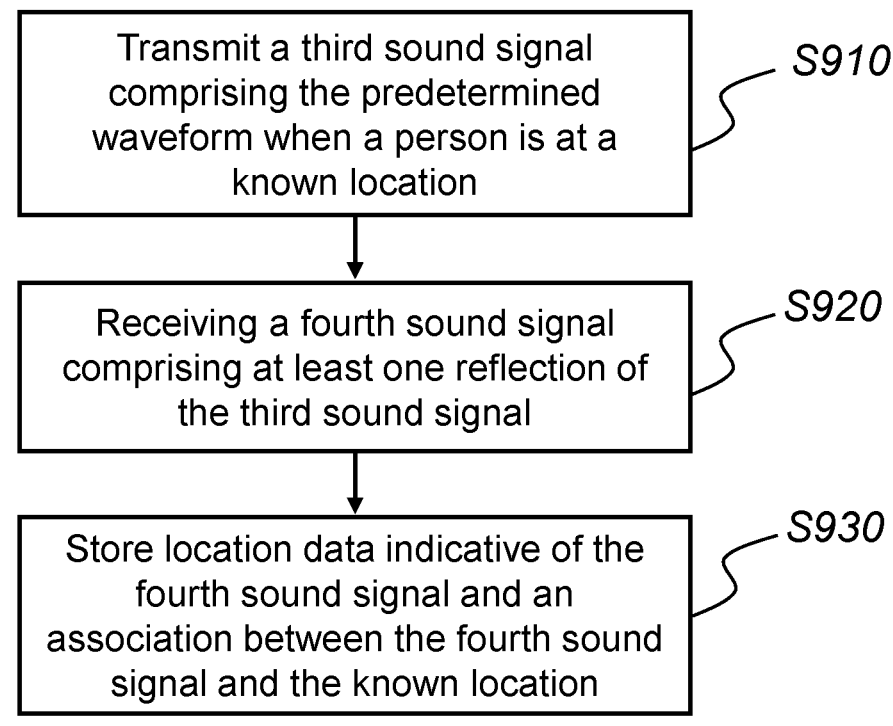

FIG. 9 is a flow diagram of a calibration method 900 in which a playback device (e.g., the playback device 410 of FIGS. 4 and 5) is prepared for being used to determine a location of a person using stored location data. The playback device transmits, at S910, a third sound signal containing a predetermined waveform, when a person is at a known location relative to the playback device. In some examples, a user may specify a known location within a playback environment, for example using a control device (e.g., the control device 130a of FIG. 1H) connected via a network to the playback device. In other examples, a user may be directed to position themselves in a predetermined known location, for example by providing an instruction to the user. Such an instruction may be audible, transmitted by a playback device or any other device in the playback system which is capable of audio reproduction. Such an instruction may be visual, for example using a display on the control device or other device in the playback system. Examples of known locations may include sitting on a particular chair, sitting in a particular position on a particular sofa, and standing in a doorway. Known locations may also be expressed in terms relative to a particular playback device or group of playback devices, such as "center" or "off-center", "left" or "right", and so on. It will be appreciated that if a person is determined to be sitting in the chair, the person may, in fact, be standing in front of the chair. In this way, each known location is associated with a region of the playback environment.

The playback device receives, at S920, a fourth sound signal containing at least one reflection of the third sound signal. Location data is stored, at S930, which includes data indicative of the fourth sound signal and further indicative of an association between the fourth sound signal and the known location of the person. In this example, the location data is stored in memory of the playback device itself. In some examples, location data may be sent to a remote computing system for storage, for example a computing system that is configured to process a second sound signal to determine a location of a person. In some examples, the location data may be sent to other devices on the playback network for storage, such as another playback device.

In the examples described above, a correspondence between two sound signals may be determined in any suitable manner. For example, a correspondence may be determined by comparing relative or absolute amplitudes and/or timings of a highest predetermined number of local peaks in the amplitude of the two sound signals. A metric score may then be determined in accordance with how closely matching the amplitudes and/or timings are, and/or the order in which the highest predetermined number of peaks occur in the signal. In another example, a correspondence may be determined by computing a correlation between the received second sound signal and each of the stored second sound signals.

Figure 10:
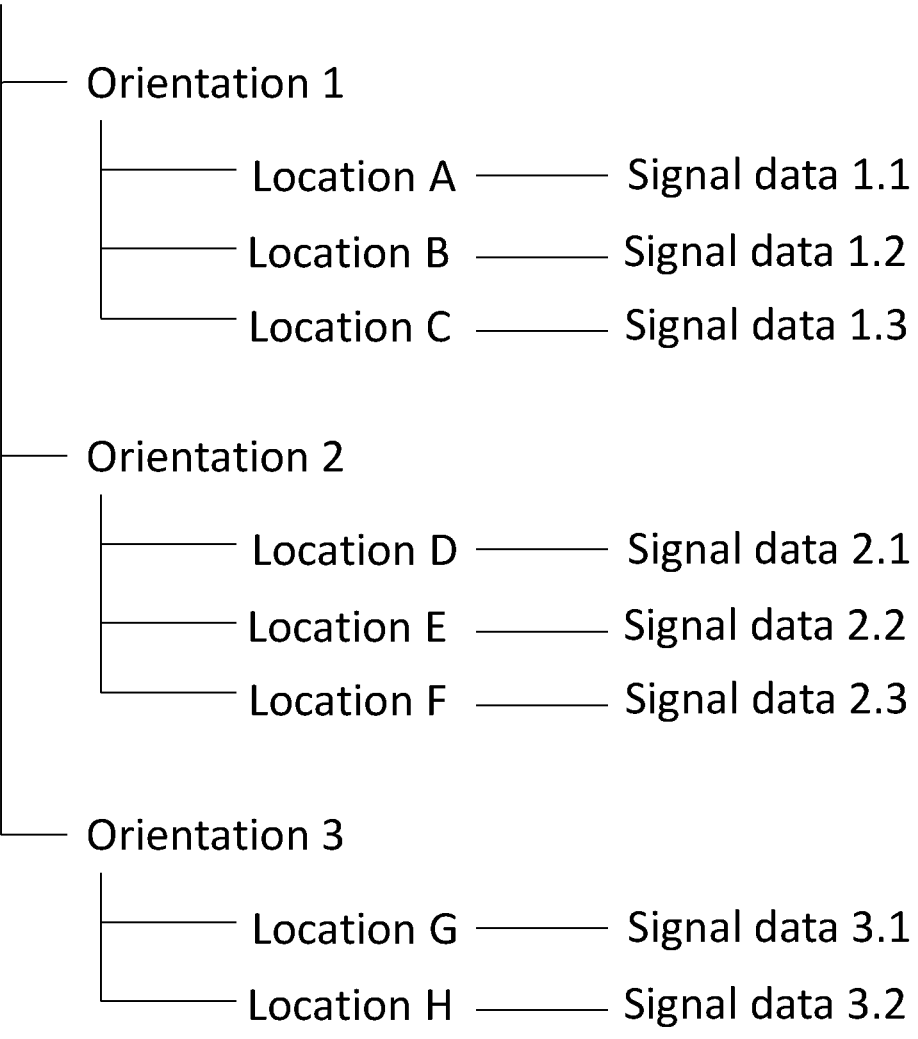
FIG. 10 is a schematic representation of a data structure for storing calibration data.

In some examples in which location data is stored for determining a location of a person, a playback device may be moved between different positions or orientations within a playback environment, or between different playback environments (for example, between different rooms in a house). In such examples, the playback device may store location data for each of a set of orientations, where the location data stored for each sound signal is associated with an orientation of the playback device. FIG. 10 shows an example of a hierarchical data structure for storing location data associated with different orientations of a playback device. In this example, location data is stored for eight different locations A-H of a person relative to the playback device. Locations A, B, and C are associated with a first orientation of the playback device. Locations D, E, and F are associated with a second orientation of the playback device, and locations G and H are associated with a third orientation of the playback device. In this example, orientation 1 and orientation 2 are different orientations of the playback device within the same room of a house (i.e. within the same playback environment). Orientation 3 is an orientation of the playback device within a different room of the house (i.e. within a different playback environment). Location data for each of the location includes signal data which is indicative of a received sound signal, and each set of stored signal data is associated with a respective location of a person relative to the playback device.

In an example in which location data is associated with an orientation of a playback device, for example as shown in FIG. 10, determining a location of a person relative to the playback device may include first determining an orientation of the playback device.

If, for example, the playback device is determined to be in orientation 1, processing a received sound signal to determine the location of the person may include comparing the received sound signal with signal data 1.1, signal data 1.2, and signal data 1.3, but not with signal data associated with orientation 2 or orientation 3. This may increase the accuracy with which a location of a person may be located, because fewer sets of signal data are required to be compared with the received sound signal. If, for example, determining a correspondence between the received second sound signal and a stored candidate signal involves determining a best correspondence between the received second sound signal and each set of stored candidate signals, comparing the received signal with fewer stored candidate signals may result in fewer erroneous results. Furthermore, comparing with fewer candidate signals reduces the amount of processing that needs to be performed in order to determine the location of the person, resulting in faster determination of the location of the person.

Orientation can be determined in several ways. For example, an accelerometer within the device may be used to determine whether the device is positioned horizontally or vertically, a stored variable may be read to determine the orientation, or the orientation may be determined with reference to external devices, such as connection of the playback device to a particular docking station. In some examples, determining an orientation of a playback device may include receiving a user input, for example using a control device associated with the playback device. For example, a user may move the playback device from a known orientation in a kitchen (orientation 1, for example) to a known orientation in a living room (orientation 2, for example), and use the control device to inform the playback device (or a computing system performing processing on behalf of the playback device) that the playback device is now in orientation 2. In other examples, determining an orientation of a playback device may include detecting a change in the orientation of the playback device from the received sound signal itself. For example, a playback device may transmit a sound signal containing a predetermined waveform, and receive a sound signal containing reflections of the transmitted sound signal. The playback device may determine that the received sound signal does not correspond to any of the stored signal data associated with orientation 1 (including signal data corresponding to orientation 1 when no person is present in the kitchen), and search for signal data associated with orientation 2 and orientation 3. If a correspondence is determined between the received signal and signal data associated with orientation 2 (for example, signal data 2.2), the playback device is determined to be in orientation 2.

In examples in which location data is associated with orientations of a playback device, calibration of the playback device may include a modification of the routine of FIG. 9 in which the orientation of the playback device is determined before or after the third sound signal is transmitted, and storing the location data includes associating the fourth sound signal with the determined orientation of the playback device. The orientation of the playback device may be determined in any suitable manner, as discussed above.

Returning now to the method 600 of FIG. 6, a characteristic of audio reproduction by the playback device is selected at S640, based on the determined location of the person. As mentioned above, an example of a characteristic of audio reproduction is a volume of the audio reproduction. Other characteristics of audio reproduction may also be selected, for example those described in detail with reference to FIG. 11 below. In the example of FIG. 4, the playback device 410 may determine that the listener 403 is located close to the playback device 410, and accordingly may select a low volume for audio reproduction. At a later time, the playback device 410 may determine that the listener 403 is located further away from the playback device 410, and may select a higher volume for audio reproduction. By periodically determining the location of the listener 413, and adjusting the volume in this way, the apparent volume of the audio reproduction experienced by the listener 413 may be substantially constant as the listener moves throughout the playback environment.

More generally, a playback device having performed the method 600 of FIG. 6 to determine a first location of a person, and selected a characteristic of audio production based on the determined first location, may at a later time transmit a third sound signal containing the predetermined waveform. The playback device may subsequently receive a fourth sound signal containing at least one reflection of the third sound signal. The playback device (or a computing system associated with the playback device) may process the fourth sound signal to determine a second location of a person, where the second location is different to the first location. The playback device may then adjust the characteristic of audio reproduction based on the determined second location of the person. In some examples, a playback device frequently transmits signals to determine a location of a person in this way, resulting in seemingly real-time adjustment of playback characteristics as a listener moves around a playback environment. A playback device may transmit signals for determining a location of a person at regular or irregular intervals, for example of at intervals greater than every 10 seconds, at intervals greater than 1 second, or at intervals greater than every 0.1 seconds.

In some examples, a playback device may perform audio reproduction from a media source simultaneously with transmitting a first sound signal containing a predetermined waveform. The playback device may subsequently receive a second sound signal containing at least one reflection of the first signal by a person, and process the received second signal to determine a location of the person relative to the playback device without interrupting the audio reproduction. In this way, characteristics of the audio reproduction may be selected and/or adjusted as the audio reproduction is performed, allowing the playback device to adapt to the location of the person. In such examples, the second sound signal received by the playback device may include reflections of audio being played back by the playback device. Such reflections will depend on the audio being played back, and therefore it is necessary to be able to distinguish reflections of the transmitted first sound signal from reflections of the audio being played back. This may be achieved, for example, by identifying the reflection of the predetermined waveform in the received second signal. In some examples, the first signal and the audio may be generated and transmitted simultaneously by the same transducer. In other examples, an additional transducer may be included for transmitting the first signal.

In some examples, a playback device may simultaneously perform audio reproduction and transmit an ultrasonic first sound signal containing a predetermined waveform for determining a location of a person. Processing the received second signal may then include passing the received second signal through a high-pass filter with a cutoff frequency just below the lowest frequency of the predetermined waveform (for example, around 20 kHz). This processing may substantially remove reflections of the audio being played back by the playback device, as the majority of the signal power in such audio is in the audible range below the lowest frequency of the predetermined waveform. Using ultrasonic signals to determine a location of a person may also cause little or no detrimental effect to the quality of audio reproduction, as the ultrasonic signal is substantially inaudible to listeners, or inaudible to a majority of listeners.

shows an example of a playback environment 1101 occupied by a listener 1103. The playback environment 1101 contains four playback devices 1110*i*, 1110*j*, 1110*k*, 1110*h*, collectively referred to as playback devices 1110, that can be configured for home theater as described above with reference to FIG. 1K. In this example, the playback devices 1110 belong to the same playback zone. A first playback device 1110*h* comprises one or more microphones and is configured to determine a location of a person and to select a characteristic of audio reproduction in accordance with the methods described herein. The playback environment 1101 also includes a sofa 1105, a desk 1107, a television 1109, and a doorway 1111. The playback devices 1110 are bonded, and are hence configured to synchronously perform audio reproduction from a media source, as described above with reference to FIGS. 1A-1M. In addition to determining a characteristic of audio production by the first playback device 1110*a*, the determined location of a person, for example the listener 1103, may be used to select a characteristic of audio production by one or more of the other playback devices 1110. For example, the first playback device 1110h may determine, by processing reflected sound signals as described above, that the listener 1103 is located on the sofa 1101, and configure the playback devices for home theater operation by selecting a particular audio channel or channels for audio reproduction by the first playback device 1110h The particular channel in this example may be a surround channel or a home cinema channel in which the first playback device 1110h is responsible for a particular part of the audio reproduction, and each of the other playback devices 1110i, 1110j, 1110k is responsible for a respective part of the audio reproduction. In this example, a respective surround channel is selected for each of the playback devices 1110j, 1110k and a Low Frequency Effects (LFE) channel is selected for the playback device 1110i.

Figure 11:
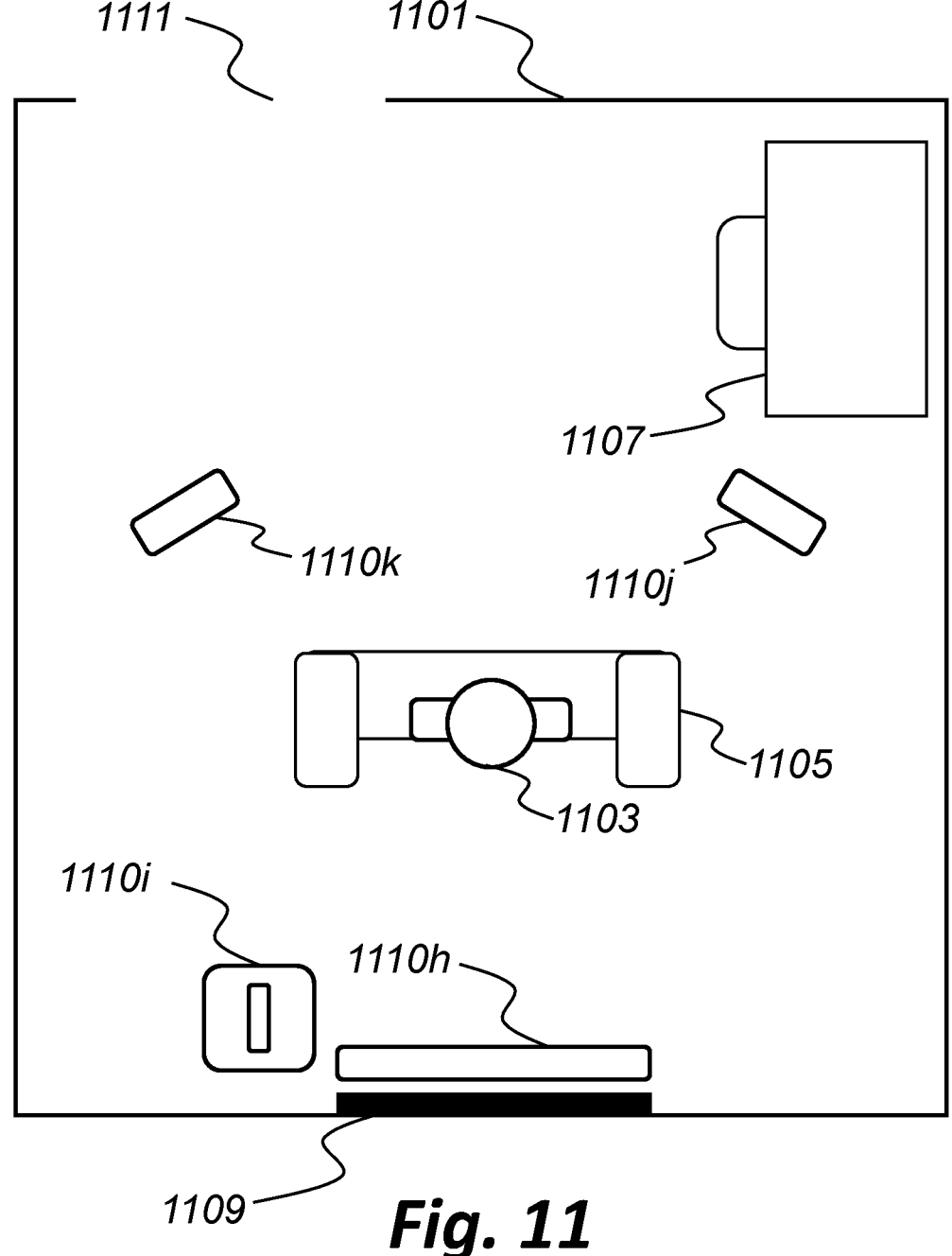
FIG. 11 is a plan view of a playback environment.

At a later time, after having been located at the sofa 1105, the listener 1103 may walk to the desk 1107. The first playback device determines, by processing reflected sound signals as described above, that the person is located at the desk 1107. Accordingly, a different channel for audio reproduction by the first playback device may be selected. The different channel may be, for example, left and right stereo channels and the playback devices 1110 may be configured for stereo reproduction. Different channels may also be selected for audio playback by the other playback devices 1110, for example left and right stereo channels may be selected for the playback devices 1110j or 1110k respectively. Alternatively, when the person is determined to be located at the desk 1107, the playback devices 1110j and 1110k may be reconfigures so that they are not part of the playback zone and no audio reproduction is performed. It will be appreciated that the embodiment described with reference to FIG. 11 is exemplary, and other arrangements of playback devices, and accordingly other configurations of audio channels are possible without departing from the scope of the invention.

A further example of a characteristic of audio reproduction that may be selected based on a determined location of a person is delay of audio reproduction by a first playback device relative to corresponding audio reproduction by another playback device bonded to the first playback device. In the embodiment of FIG. 11, the playback devices 1110j, 1110k may be configured to synchronously perform audio reproduction on respective surround sound channels. The listener 1103 may be determined to be located closer to the playback device 1110j than to the playback device 1110k. The playback device may then select a respective delay of audio reproduction by the playback devices 1110j and 1110k. By selecting a delay in this way, audio from different playback channels arrives at the listener 1103 substantially in phase, improving the listening experience for the listener 1103.

In some examples, a bonding, pairing, or grouping of playback devices may be altered dynamically based on a determined location of a person. In the example of FIG. 11, if a person is determined to be located in or near the doorway 1111, playback devices in the next room, which belong to a different playback zone to the playback devices 1110, may be grouped with the playback devices 1110 so that the playback devices in the two neighboring rooms may perform audio reproduction synchronously. The person may therefore experience a substantially seamless transition as the person moves from the playback environment 1111 to the neighboring playback environment. Alternatively, bonding or pairing of playback devices within a single playback environment may be altered depending on a determined location of a person. In the example of FIG. 11, the playback devices 1110h, 1110i, 1110j, 1110k, may only be mutually bonded to form a playback zone when a person is determined to be located on the sofa 1103. Otherwise, the playback devices may each perform audio reproduction independently, or one or more subsets of the playback devices may form respective playback zones.

In some examples, a playback device arranged to determine a location of a person according to the methods described herein, may receive an audio signal including a spoken input, and may associate the spoken input with the determined location of the person. By associating a spoken input with a determined location of a person, the playback device (or a computing system processing the spoken input received by the playback device) may ascertain additional information relating to the spoken input. For example, the playback device may receive a spoken input from a person which may use a location-based context to interpret the input. This may be an explicit statement, an utterance such as "near me", "where I am" or implicit in the command, such as an utterance to "turn down the volume" which may use a location to determine for which playback devices volume is turned down. Other examples are possible and in general a spoken input may be associated with a determined location of the person. The playback device may, for example, adjust a characteristic of audio reproduction in response to receiving the spoken input. Adjusting a characteristic of audio reproduction in response to receiving a spoken input may prevent unwanted adjustments of characteristics, for example if a person temporarily moves from the sofa 1105 of FIG. 11 whilst the playback devices 1110 are configured in home cinema mode. Alternatively, the spoken input may include a voice command to control audio reproduction by the playback device. For example, a playback device may at a certain time be in an idle mode and not performing audio reproduction, and may receive an audio signal including a spoken input from a person saying, "turn the music on". The playback device may associate the spoken input with a determined location of the person, and begin audio reproduction with characteristics selected based on the determined location of the person. In a further example, a playback device may receive an audio signal from a person saying, "turn the music down near me". The playback device may reduce the volume of audio reproduction by one or more playback devices near the determined location of the person, but not reduce the volume of audio reproduction by playback devices not near the determined location of the person.

In some examples, a spoken input may include a voice command to control a further device, for example a further device other than a playback device. In response to receiving a spoken input, a playback device may send a control signal to the further device dependent on a determined location of a person. For example, a playback device arranged to determine a location of a person according to the methods described herein may be connected via a network to one or more further devices, such as a thermostat (e.g., NEST® thermostat), an illumination device (e.g., a PHILIPS HUE® lighting device), or a further media playback device (e.g., a Sonos® playback device). The playback device may receive an audio signal containing a spoken input including a voice command to control one of the further devices.

In one example, the listener 1103 in FIG. 11 may initially be located on the sofa, watching a film on the television 1109. The playback devices 1110 may be configured to perform audio reproduction in a home cinema mode, and lighting in the playback environment 1101 may be dimmed.

The listener 1103 may subsequently stop watching the film, and walk to the desk 1107 to do some work. The playback device 1110a may then determine that the listener 1103 is located at the desk 1107. The playback device 1110a may receive a spoken input from the listener containing a voice command saying, "turn the lights on over here". The playback device 1110a may associate the spoken input with the determined location of the person (at the desk 1107) and accordingly send a control signal to an illumination device controlling the lighting in the playback environment 1101. The illumination device may, in response to receiving the control signal, turn on a light near the desk 1107. The illumination device may further turn off the lights near the sofa, or alternatively may undim the lights near the sofa.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The above embodiments are to be understood as illustrative examples of the invention. Further embodiments of the invention are envisaged. For example, multiple playback devices may be connected via a network within a smart home environment, each being configured to determine a location of a person within a respective portion of the environment, for example a particular room in the smart home, and to send control signals to devices within the respective portion.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device having a housing comprising:
   one or more network interfaces;
   one or more audio transducers;
   one or more microphones;
   one or more processors; and
   data storage having instructions stored thereon that, when executed by one or more processors of the playback device, cause the playback device to perform operations comprising:
   transmitting, via at least one of the one or more audio transducers in the playback device, a first signal comprising a first audio output via the one or more audio transducers;
   receiving, via the one or more microphones in the playback device, a second signal comprising acoustic reflection of the first audio output;
   determining, based on a comparison of the first signal and the second signal, a first location of a user;
   determining, based on the determined first location of the user, a first set of one or more devices near the user;
   receiving a first voice input from the user, the first voice input comprising a first location-based request associated with a first action to be performed via one or more devices near the user;
   selecting, based on the first location-based request, at least one first device from the set of one or more devices near the user;
   causing, via at least one of the one or more network interfaces, the first action to be performed via the at least one selected first device;
   transmitting, via the one or more audio transducers in the playback device, a third signal comprising a second audio output;
   receiving, via the one or more microphones in the playback device, a fourth signal comprising acoustic reflection of the second audio output;
   determining, based on a comparison of the third signal and the fourth signal, a second location of the user different from the first location of the user;
   determining, based on the determined second location of the user, a second set of one or more devices near the user, wherein the second set of one or more devices includes at least one different device from the first set of one or more devices;
   receiving, a second voice input from the user, the second voice input comprising a second location-based request associated with a second action to be performed via one or more devices near the user;
   selecting based on the second location-based request, at least one second device from the second set of one or more devices near the user, wherein the second device is different from the first device; and causing, via the one or more network interfaces of the playback device, the second action to be performed via the at least one selected second device.

2. The playback device of claim 1, wherein the first signal and the third signal each comprises one or more frequencies greater than 18 kHz.

3. The playback device of claim 1, wherein the at least one selected first device of the first set of one or more devices or the at least one selected second device of the second set of one or more devices does not include the playback device.

4. The playback device of claim 1, wherein determining the first set of one or more devices near the user and determining the second set of one or more devices near the user comprises determining the set of one or more devices within the same listening environment as the user.

5. The playback device of claim 1, wherein determining the first set of one or more devices near the user and determining the second set of one or more devices near the user comprises determining the set of one or more devices within the same listening environment as the user and within at least one neighboring listening environment.

6. The playback device of claim 1, wherein determining, based on the first determined location of the user, a first set of one or more devices near the user comprises sending and receiving data via the one or more network interfaces.

7. A method comprising:

transmitting, via one or more audio transducers in a playback device, a first signal comprising a first audio output via the one or more audio transducers;

receiving, via one or more microphones in the playback device, a second signal comprising acoustic reflection of the first audio output, wherein the playback device includes a housing in which both the one or more audio transducers and the one or more microphones are disposed;

determining, based on a comparison of the first signal and the second signal, a first location of a user;

determining, based on the determined first location of the user, a first set of one or more devices near the user;

receiving a first voice input from the user the first voice input comprising a first location-based request associated with a first action to be performed via one or more devices near the user;

selecting, based on the first location-based request, at least one first device from the set of one or more devices near the user; and causing, via at one or more network interfaces of the playback device, the first action to be performed via the at least one selected first device;

transmitting, via the one or more audio transducers in the playback device, a third signal comprising a second audio output;

receiving, via the one or more microphones in the playback device, a fourth signal comprising acoustic reflection of the second audio output;

determining based on a comparison of the third signal and the fourth signal a second location of the user different from the first location of the user;

determining, based on the determined second location of the user, a second set of one or more devices near the user, wherein the second set of one or more devices includes at least one different device from the first set of one or more devices;

receiving, a second voice input from the user, the second voice input comprising a second location-based request associated with a second action to be performed via one or more devices near the user;

selecting, based on the second location-based request, at least one second device from the second set of one or more devices near the user, wherein the second device is different from the first device, and causing, via the one or more network interfaces of the playback device, the second action to be performed via the at least one selected second device.

8. The method of claim 7, wherein the first signal and the third signal each comprises one or more frequencies greater than 18 kHz.

9. The method of claim 7, wherein the at least one selected first device of the first set of one or more devices or the at least one selected second device of the second set of one or more devices does not include the playback device.

10. The method of claim 7, wherein determining the first set of one or more devices near the user and determining the second set of one or more devices near the user comprises determining the set of one or more devices within the same listening environment as the user.

11. The method of claim 7, wherein determining the first set of one or more devices near the user and determining the second set of one or more devices near the user comprises determining the set of one or more devices within the same listening environment as the user and within at least one neighboring listening environment.

12. The method of claim 7, wherein determining, based on the first determined location of the user, a first set of one or more devices near the user comprises sending and receiving data via the one or more network interfaces.

13. One or more tangible, non-transitory computer-readable media storing instructions that, when executed by one or more processors of a playback device comprising a housing having one or more audio transducers and one or more microphones disposed therein, cause the playback device to perform operations comprising:

transmitting, via the one or more audio transducers in the playback device, a first signal comprising a first audio output via the one or more audio transducers;

receiving, via the one or more microphones of the playback device, a second signal comprising acoustic reflection of the first audio output;

determining, based on a comparison of the first signal and the second signal, a first location of a user;

determining, based on the determined first location of the user, a first set of one or more devices near the user;

receiving a first voice input from the user the first voice input comprising a first location-based request associated with a first action to be performed via one or more devices near the user;

selecting, based on the first location-based request, at least one first device from the set of one or more devices near the user; and causing, via at one or more network interfaces of the playback device, the first action to be performed via the at least one first selected device;

transmitting, via the one or more audio transducers in the playback device, a third signal comprising a second audio output;

receiving, via the one or more microphones in the playback device, a fourth signal comprising acoustic reflection of the second audio output;

determining based on a comparison of the third signal and the fourth signal, a second location of the user different from the first location of the user;

determining, based on the determined second location of the user, a second set of one or more devices near the user, wherein the second set of one or more devices includes at least one different device from the first set of one or more devices;

receiving, a second voice input from the user, the second voice input comprising a second location-based request associated with a second action to be performed via one or more devices near the user;

selecting, based on the second location-based request, at least one second device from the second set of one or more devices near the user, wherein the second device is different from the first device; and causing, via the one or more network interfaces of the playback device, the second action to be performed via the at least one selected second device.

14. The one or more computer-readable media of claim 13, wherein the first signal and the third signal each comprises one or more frequencies greater than 18 kHz.

15. The one or more computer-readable media of claim 13, wherein the at least one selected first device of the first set of one or more devices or the at least one selected second device of the second set of one or more devices does not include the playback device.

16. The one or more computer-readable media of claim 13, wherein determining the first set of one or more devices near the user and determining the second set of one or more devices near the user comprises determining the set of one or more devices within the same listening environment as the user.

17. The playback device of claim 1, wherein the at least one selected first device of the first set of one or more devices near the user or the at least one selected second device of the second set of one or more devices near the user includes one or more of a thermostat, an illumination device, or an additional media playback device.

18. The playback device of claim 1, wherein at least one of the first action or the second action includes activating a light near the user.

19. The playback device of claim 18, wherein the first action comprises activating lights near the first location of the user, and wherein the second action comprises activating lights near the second location of the user and deactivating lights near the first location of the user.

20. The playback device of claim 1, wherein the first action comprises beginning audio reproduction in a first playback device of the at least one selected first device of the first set of one or more devices near the first location of the user, and wherein the second action comprises beginning audio reproduction in a second playback device of the at least one selected second device of the second set of one or more devices near the second location of the user and modifying audio reproduction by the first playback device.

* * * * *